(12) United States Patent
Nayudu et al.

(10) Patent No.: US 11,610,279 B2
(45) Date of Patent: Mar. 21, 2023

(54) CLOSE MARKETPLACE

(71) Applicant: CloseQuest Inc, San Jose, CA (US)

(72) Inventors: Nainesh Nayudu, San Jose, CA (US); Sukrita Malhotra, San Jose, CA (US)

(73) Assignee: CloseQuest Inc, San Jose, CA (US)

( * ) Notice: Subject to any disclaimer, the term of this patent is extended or adjusted under 35 U.S.C. 154(b) by 64 days.

(21) Appl. No.: 17/067,704

(22) Filed: Oct. 11, 2020

(65) Prior Publication Data

US 2021/0110500 A1 Apr. 15, 2021

Related U.S. Application Data

(60) Provisional application No. 62/914,450, filed on Oct. 12, 2019.

(51) Int. Cl.

| | |
|---|---|
| G06Q 50/26 | (2012.01) |
| G06Q 30/018 | (2023.01) |
| G06Q 10/1093 | (2023.01) |
| H04L 9/40 | (2022.01) |
| G06Q 50/16 | (2012.01) |
| G06Q 10/107 | (2023.01) |
| G06Q 30/0645 | (2023.01) |
| G06Q 30/0601 | (2023.01) |

(52) U.S. Cl.
CPC ......... G06Q 50/265 (2013.01); G06Q 10/107 (2013.01); G06Q 10/1095 (2013.01); G06Q 30/0185 (2013.01); G06Q 30/0609 (2013.01); G06Q 30/0645 (2013.01); G06Q 50/16 (2013.01); H04L 63/10 (2013.01)

(58) Field of Classification Search
None
See application file for complete search history.

(56) References Cited

U.S. PATENT DOCUMENTS

| | | | | |
|---|---|---|---|---|
| 2009/0265319 A1* | 10/2009 | Lehrman | ............. | G06F 16/9535 |
| | | | | 707/999.009 |
| 2010/0174727 A1* | 7/2010 | Zappacosta | ........... | G06F 16/951 |
| | | | | 707/E17.14 |
| 2012/0116907 A1* | 5/2012 | Skelton | ................. | H04L 67/306 |
| | | | | 705/26.1 |
| 2013/0346268 A1* | 12/2013 | Pereira | ...................... | G06F 8/65 |
| | | | | 709/224 |
| 2014/0372252 A1* | 12/2014 | Raney | ................ | G06Q 30/0615 |
| | | | | 705/26.35 |

(Continued)

*Primary Examiner* — Jamie H Austin
(74) *Attorney, Agent, or Firm* — Makoui Law, PC; Ali Makoui

(57) ABSTRACT

A close marketplace is provided where the users' institutional affiliation, identity, and/or criminal record are verified in order to become members. Although an unregistered person may browse some of the posted listings, in order to buy, sell, contact, and/or meet another member of the marketplace, a person has to be affiliated with an approved institution, the person's real life identity has to be verified, and/or the person's criminal background has to meet a pre-determined criteria. The marketplace lowers the risk for the strangers who may want to interact with each other through a close circle of professionals. When two members are going to meet through the marketplace to buy and sell items, to rent, to be roommates, to date, etc., they have an assurance that each member has gone through a validation and verification process.

18 Claims, 24 Drawing Sheets

(56) References Cited

U.S. PATENT DOCUMENTS

2015/0235333 A1\* 8/2015 Bangerter ............ G06Q 50/163
                                                  705/314
2017/0126784 A1\* 5/2017 Mattern .................. H04L 67/32
2019/0156291 A1\* 5/2019 Nayak ................ G06Q 10/0635

\* cited by examiner

CLOSE MARKETPLACE

CLAIM OF BENEFIT TO PRIOR APPLICATIONS

This application claims the benefit of U.S. Provisional Patent Application Ser. No. 62/914,450, filed on Oct. 12, 2019. The contents of U.S. Provisional Patent Application 62/914,450 are hereby incorporated by reference.

BACKGROUND

The peer to peer online marketplaces provide forums for peers to directly buy and sell merchandise, rent residential and office spaces, find roommates, share residential and office spaces, etc. The peers often require meeting in order to inspect the merchandise or the residential and office spaces. Dating websites also facilitate people meeting and dating each other.

Meeting strangers introduced through online websites involves a risk. The present online marketplaces and dating websites do not mitigate or reduce the risks involved in meeting strangers to inspect, buy, or sell merchandise, to rent residential and office spaces, or to date.

BRIEF DESCRIPTION OF THE DRAWINGS

The various embodiments of the present close marketplace now will be discussed in detail with an emphasis on highlighting the advantageous features. These embodiments depict the novel and non-obvious close marketplace shown in the accompanying drawings, which are for illustrative purposes only. These drawings include the following figures, in which like numerals indicate like parts.

DETAILED DESCRIPTION

Figure 1:
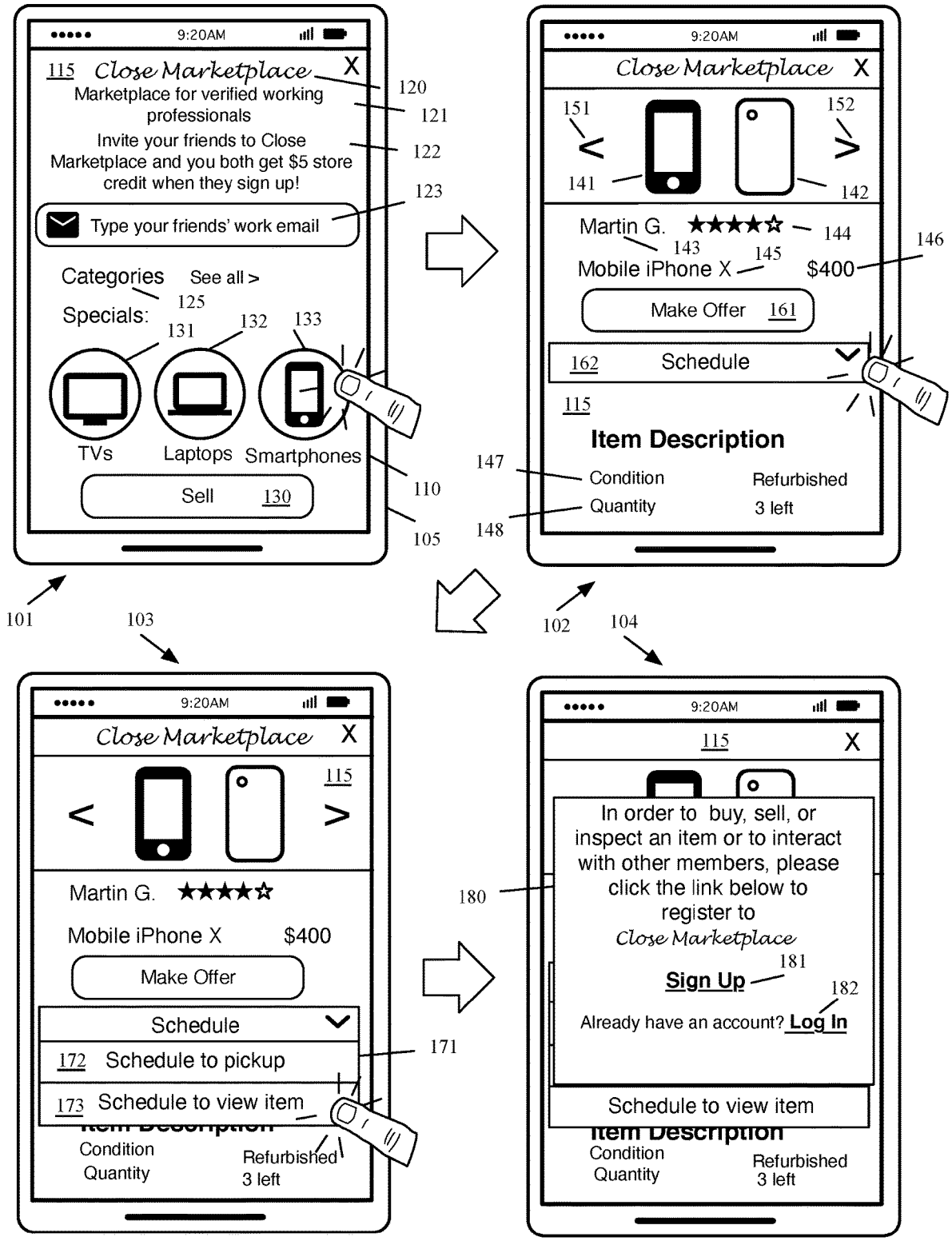
FIG. 1 is a schematic front view of an electronic device that displays a user interface for a close marketplace, according to various aspects of the present disclosure.

One aspect of the present embodiments includes the realization that the prior art peer to peer marketplaces do not verify the identities and the backgrounds of the marketplaces' users. As such, when the peers using these marketplaces are going to contact or meet each other, their identities and backgrounds are not verified and the members have to go through the risk of meeting unqualified strangers. Additionally, the peers signing up to these prior art peer to peer marketplaces are not verified to be working professionals.

The present embodiments, as described in detail below, solve the above-mentioned problems by providing a close marketplace where the users' institutional association, identity, and/or criminal record are verified in order to sign them up to the marketplace. Although an unregistered person may browse some of the listings posted on the marketplace, in order to buy, sell, contact, and/or meet another member of the marketplace, a person has to be affiliated with an approved institution, the person's real life identity has to be verified, and/or the person's criminal background has to meet a pre-determined criteria. The approved institutions in different embodiments may be included in one or more categories such as companies with publicly traded stocks, privately held companies, educational institutions such as universities and colleges, governmental bodies, hospitals, etc. The companies may include different legal entities such as, for example and without limitations, publicly owned stock corporations, privately owned stock corporations, limited liability corporations (LLCs), etc. Persons affiliated with an approved institutions may be, for example, the employees of the institution, the directors of the institution, the students of the institution (e.g., when the institution is an educational institution), etc.

The close marketplace, therefore, lowers the risk for the strangers who may want to interact with each other through a close circle of professionals. When two peers are going to meet through the close marketplace to buy and sell items, to rent, to be roommates, to date, etc., they have an assurance that each member has gone through a validation and verification process. The close marketplace becomes a low risk forum for local people in each geographical region to buy and sell merchandise, to rent, to meet, to date, etc. The close marketplace, in some embodiments, may also facilitate a peer to peer method of payments to facilitate eCommerce transactions, rental transactions, etc., where the funds are transferred from the bank or credit card account of a buyer to the bank account of a seller.

Different embodiments may use different methods to verify and validate the institutional association, the identity, and the criminal record of the members. The users' consent may be received prior to these verification and validations. Additional consents may be required prior to sharing a member's personal information with other peers.

The institutional affiliation may be checked by verifying one or more of, for example and without limitations, a work email, a university or college email, a work telephone number, the employment history, etc. The institutional affiliation may be checked by algorithms performed by the close marketplace or by using a third party vendor's application based on full name, telephone number, institutional email, etc.

The identity of the potential members may be verified either in combination with the institutional affiliation or on its own. For example, and without limitations, the identity may be verified using a work email, a university or college email, a work telephone number, etc. The identity may be verified based on a government issued identity such as, for example and without limitations, a driver license, a passport, several digits of social security number, etc. The identity may be verified by algorithms performed by the close marketplace or by using a third party vendor's application. The identity, in some embodiments, may be verified by a process such as know your customer/know your client (KYC).

The identity, in some embodiments, may be verified by a person holding an identification in front of a camera and verifying the identification captured by the camera. The person may be required to take a selfie photo and the selfie photo may be compared with the photo from the identification held by the person in front of the camera. The person may be required to make certain movements when taking the selfie photo to make sure the person is not using someone else's picture.

The background check may be done, for example, and without limitations, based on the name, date of birth, address, social security number, etc. The background check may include, for example, and without limitations, criminal record check, sex offender search, Office of Foreign Assets Control (OFAC)/Patriot Act's records search, known aliases search, etc.

Some embodiments may provide a close network for finding dates and romantic relationships. The close network membership may require the proof of affiliation with an institution in a list of approved institutions, proof of identity, and passing background check. The close network, in some embodiments, may provide an option for the members to require additional qualifications for potential dates and romantic partners. The additional qualifications may include providing the results of a health check.

The personal information of the members and potential members are encrypted during transmission and for storage. Only the information to which a person consents is verified, stored, and/or shared with other members.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic front view of an electronic device that displays a user interface for a close marketplace, according to various aspects of the present disclosure. The electronic device may be any computing device with a display such as, for example, and without limitations, a smartphone, a tablet computer, a laptop computer, a desktop computer, a personal digital assistant (PDA), etc.

FIG. 1, as shown, includes four operational stages 101-104. In stage 101, the display 110 of the electronic device 105 may display a user interface (UI) 115 of a close marketplace. The UI 115 may be accessed, for example and without limitations, from a browser application that runs on the electronic device 105.

Figure 2:
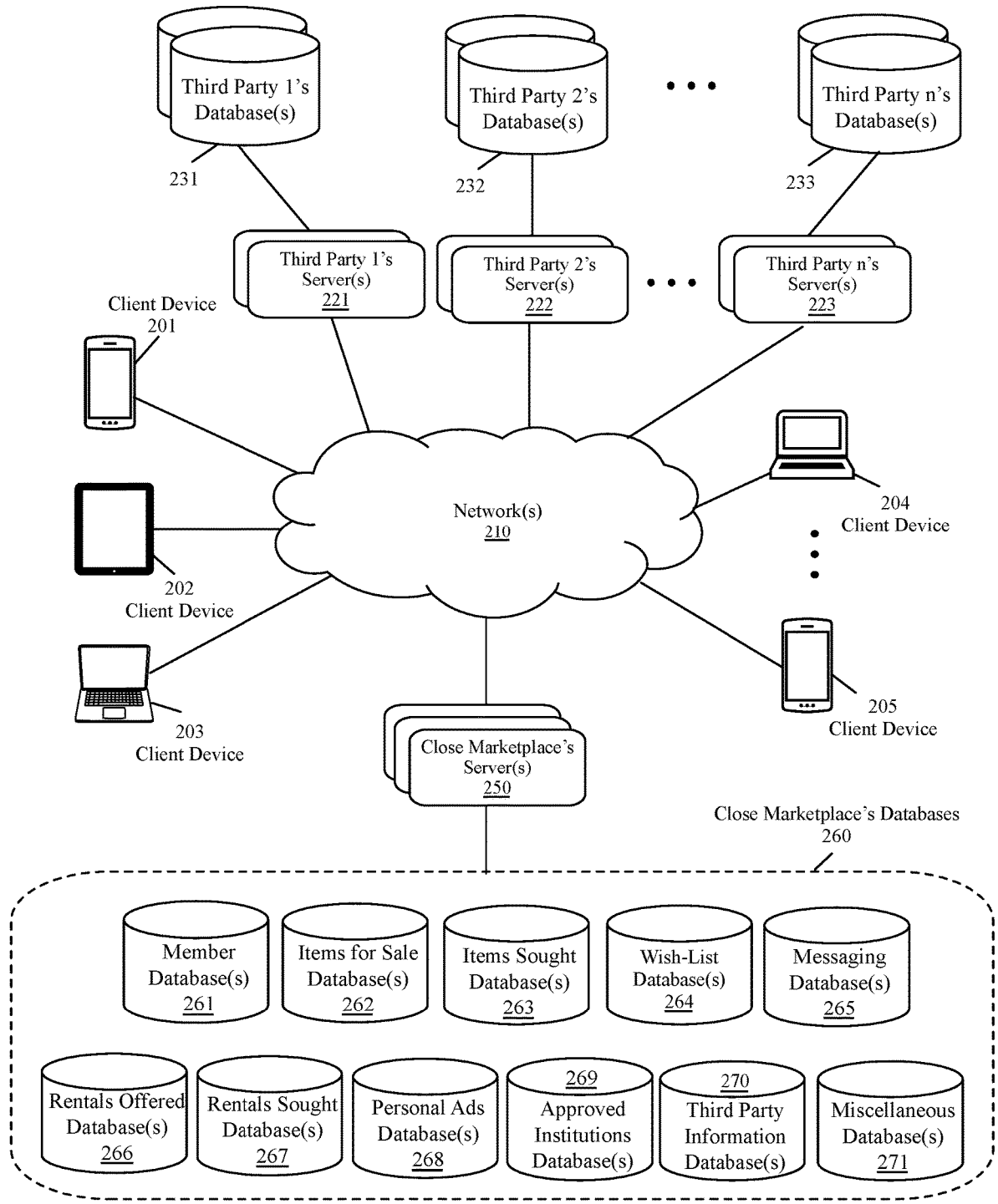
FIG. 2 is a functional block diagram illustrating an example system for providing a close marketplace, according to various aspects of the present disclosure.

The close marketplace, in some embodiments, is implemented on one or more electronic devices such as, for example, and without limitations, servers and client devices. Client devices, such as the electronic device 105, may access the close marketplace's server(s) through one or more networks. FIG. 2 is a functional block diagram illustrating an example system for providing a close marketplace, according to various aspects of the present disclosure. With reference to FIG. 2, the close marketplace may be implemented on one or more electronic devices such as the servers 250.

The close marketplace may include one or more databases 260. The databases 260 may include, for example, and without limitations, one or more member databases 261, one or more items for sale databases 262, one or more items sought databases 263, one or more items for wish-list databases 264, one or more messaging databases 265, one or more rentals offered databases 266, one or more rentals sought databases 267, one or more personal ads databases (e.g., for finding dates and romantic relationships) 268, one or more approved institutions database 269, one or more third party information databases 270, and one or more miscellaneous databases 271. It should be understood that the function of the databases 261-271 may be implemented with fewer or with more databases. The databases 261-271 may be used to store, for example, and without limitations, lists, tables, data structures, individual data items, messages, communication packets, etc.

The close marketplace may facilitate peer to peer transactions, for example, and without limitations, to buy and sell items, to offer and lease rentals, to find roommates, to find dates, etc. The peers may interact with each other through the close marketplace's server(s) 250 using the client devices 201-205. The client devices 201-205 may be electronic devices such as the electronic device 105 of FIG. 1. For example, and without limitations, the client devices 201-205 may be smartphones, tablet computers, laptop computers, desktop computers, PDAs, etc. The client devices 201-205 may communicate with the close marketplace's server(s) 250 through one or more networks 210, for example, and without limitations, through the Internet, local area networks (LANs), wide area networks (WANs), home networks, etc.

The member database(s) 261 may be used to store the personal information of the close marketplace's members. The personal information may be encrypted during transmission between the client devices 201-205 and the close marketplace's server(s) 250. A portion of the members' personal information (e.g., and without limitations, name, address, institutional affiliation, a portion of the members' background check, a portion of the members' medical results) may be encrypted and stored in the member database(s) 261. Any portion of a member's personal information to which the member has not provided consent to store may be deleted.

The items for sale database(s) 262 may store information for the items the members list to sell to the peers. The information for the items may include, for example, and without limitations, the description, the prices, the name (e.g., the user name) of the seller, the quantities offered, the condition of the items (e.g., without limitations, used, new, refurbished, etc.), a ranking of the seller by other peers, a geographical area where the item is located, etc. In some aspects of the present embodiments, the items for sale database(s) 262 may store information for items that the members may want to be rented (e.g., and without limitations, equipment, tools, containers, etc.). In some aspects of the present embodiments, a limited number of items may be offered for sale by the close marketplace (as opposed to the items offered for sale by peers) in order to generate additional visitor traffic to the close marketplace.

The items sought database(s) 263 may store information for items that peers are looking to purchase. The information for the items may include, for example, and without limitations, the description, the maximum price (or a price range), the name (e.g., the user name) of the buyer, the quantities needed, the condition of the items (e.g., without limitations, used, new, refurbished, any, etc.), a geographical area where the desired item has to be located, etc. In some aspects of the present embodiments, the items sought database(s) 263 may store information for items that the members may want to rent from other peers (e.g., and without limitations, equipment, tools, containers, etc.).

The wish-list database(s) 264 may store items that members may wish to purchase in future. The messaging database(s) 265 may be used to store messages the members send to each other and/or the messages exchanged between the members and the close marketplace. The rentals offered database(s) 266 may store the information regarding properties offered for rent. The information may include, for example, and without limitations, the type of the property (e.g., and without limitations, room, apartment, house, guest house, office space, etc.), the size of the property, the asking price, whether or not the property is to be shared with others, the availability date, etc.

The rentals sought database(s) 267 may store the information regarding properties sought to rent. The information may include, without limitations, the type of the property (e.g., and without limitations, room, apartment, house, guest house, office space, etc.), the size of the property, the desired price or price range, whether or not the member is willing to share the property with others, the date the property is needed, etc.

The personal ads database(s) 268 may store ads for finding dates and romantic relationships. In this specification, the term personal ad refers to advertisement that people place to find dates and romantic relationships. The information in the personal ads may include a description of the person seeking a date and a description of a desired date. As described further below, in some aspects of the present embodiments, any person who wishes to create a personal ad or to respond to a personal ad has to consent to a background check and the background check results may have to pass one or more predetermined criteria in order for the person to be qualified to create or to respond to personal ads.

As described below, the close marketplace, in some embodiments, may allow viewing of some of the listings to unregistered viewers. However, buy, selling, and listing items as well as contacting or meeting other members require becoming a member based on one or more criteria such as, for example, and without limitations, affiliation with an approved institution, identification verification, background verification, etc.

The close marketplace may use the information stored in one or more of the close marketplace's databases 260 to verify a potential member's information. For example, the approved institutions database(s) 269 may store a list of institutions such as, for example, and without limitations, established companies, certain colleges and universities, certain government agencies, etc., in order to verify a potential member's institutional affiliation. In some aspects of the present embodiments, the approved institutions database(s) 269 may include institution names from well-established commercial or government lists such as, for example, and without limitations, Fortune 500, Dun and Bradstreet, Crunchbase, U.S. Department of Education list of colleges and universities, etc.

The approved institutions database(s) 269 may include the name of institutions from one or more categories such as, for example, and without limitations, publicly traded companies, privately held companies, educational institutions such as universities and colleges, governmental bodies, hospitals, etc. The companies may include different legal entities such as, for example, and without limitations, publicly owned stock corporations, privately owned stock corporations, LLCs, etc. The miscellaneous database(s) 271 may include any other data items that may be required by the close marketplace server(s) 250.

In some aspects of the present embodiments, the close marketplace server(s) 250 may use services of third parties such as vendors or government agencies to verify potential members' identity, institutional affiliation, and/or background. The third party server(s) 221-223 may belong, for example, and without limitations, to vendors that verify identity, verify institutional affiliation, perform criminal background check, obtain credit information, verify employment, etc. The third party servers 221-223 may belong to, for example, and without limitations, government agencies or private entities that maintain criminal records, sex offender lists, OFAC/Patriot Act records, etc. The third party server(s) 221-223 may maintain and/or have access to one or more corresponding databases 231-233.

Referring back to FIG. 1, the UI 115 in stage 101 may display the name 120 of the marketplace (in this example, the name is "Close Marketplace") and one or more messages 121-123 to the viewers. The UI 115 may include a link 125 for displaying shopping categories, a link 130 to list items for sale, and one or more links 131-133 to special items on sale. As shown, in stage 101, the UI 115 may receive a selection of an option 133 to display special deals on smartphones.

In response, the UI 115, in stage 102, may display one or more smartphones that are listed for sale. In this example, the pictures 141-142 of a smartphone for sale are displayed. Other information, such as, for example, and without limitations, the user name 143 of the seller, the ranking 144 of the seller, the smartphone's type 145, the asking price 146, the item's condition 147, and the available quantity 148 may be displayed. Other smartphones for sale may be displayed by scrolling through a list using the scroll tools 151 and 152.

The UI 115 may display an option 161 to make an offer to buy the item or select a drop down item 162 to schedule a meeting with the seller. In this example, a selection of the drop down option 162 to schedule a meeting with the seller is received in stage 102.

In response, a drop down menu 171 is displayed in stage 103 that provides an option 172 to schedule a pickup and an option 173 to schedule a meeting to view the item. In the example of FIG. 1, a selection of the option 173 to schedule a meeting to view the item is received. As shown, in stage 104, the UI 115 may display a message 180 indicating that a person who wants to buy, sell, or inspect an item or to interact with other members, has to either sign up to the close marketplace or to log in, if the person already has an account. The message 180 provides an option 181 to sign up (or register) and an option 182 to log in to the close marketplace.

Figure 3A:
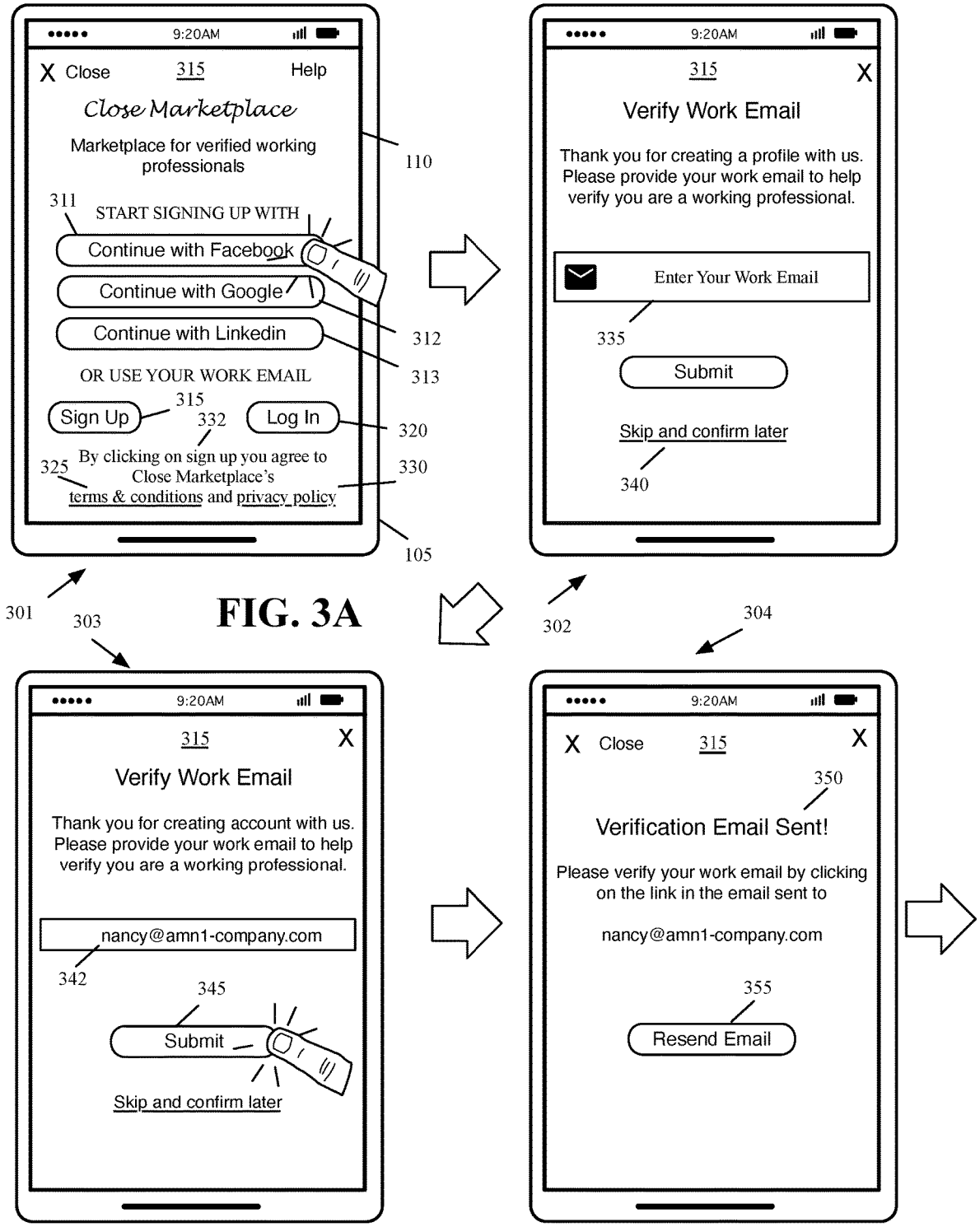
FIGS. 3A-3B illustrate a schematic front view of an electronic device that displays a user interface for signing up or logging in to a close marketplace, according to various aspects of the present disclosure.
Figure 3B:
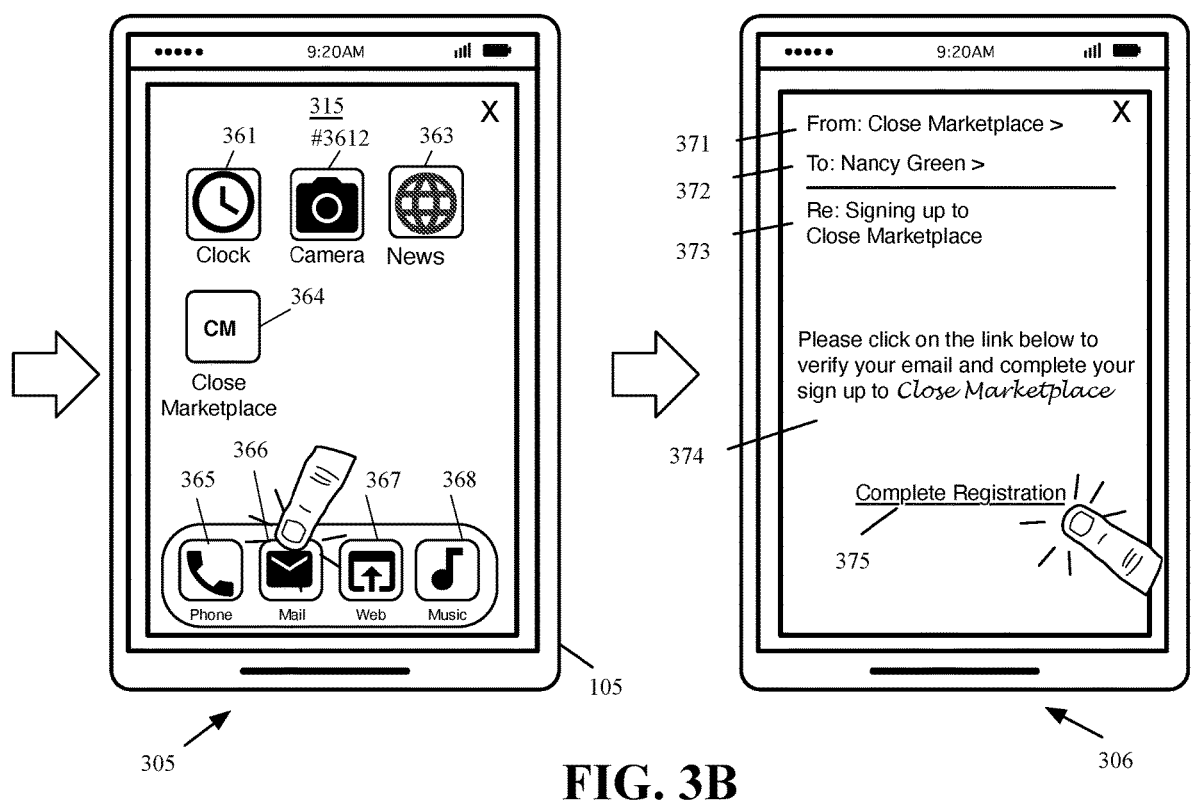

FIGS. 3A-3B illustrate a schematic front view of an electronic device that displays a user interface for signing up or logging into a close marketplace, according to various aspects of the present disclosure. FIGS. 3A-3B, as shown, include six operational stages 301-306. In stage 301, the display 110 of the electronic device 105 may display a UI 315 for signing up or logging in to the close marketplace. The UI 315 may be displayed, for example, and without limitations, when one of the options 181 or 182 of FIG. 1 are selected.

The UI 315, in stage 301, may provide several options 311-313 to start the sign up process using different social media accounts. As describe further below, using the social media accounts facilitates providing information needed for creating an account but a person's institutional affiliation and identity has to be verified before a person is signed up as a member of the close marketplace.

With further reference to FIGS. 3A-3B, the UI 315 may provide an option 315 to directly sign up (or register) to the close marketplace and an option 320 to log into the close marketplace (if the person has already signed in). The UI 315 may display an option 325 for reviewing the terms and conditions of becoming a member and using the close marketplace. The UI 315 may further display an option 330 for reviewing the privacy policy of the close marketplace. As shown by 332, the user of the electronic device 105 may have to provide consent by agreeing to the close marketplace's terms and conditions 325 and privacy policy 330.

The UI 315, in stage 301, may receive a selection of the option 311 to sign up using a social media account's credentials. Using the social media account's credentials may provide a quick way of transferring the person's information such as name, address, phone number, etc., from the social media account of the person to the close marketplace.

Signing up through a social media account may help in account set up but is not used by the closed marketplace to verify the institution affiliation or the identify of a person in order to sign up the person with the close marketplace. In the example of FIGS. 3A-3B the close marketplace has to verify a person's institutional affiliation and identity using a work email before signing up the person.

As shown in stage 302, the UI 315 may display a message 335 requesting a work email to be entered. The UI 315 may provide an option 340 to skip entering a work email and confirm the work email at a later time. If the UI receives a selection of option 340, the person may not be signed up as a member of the closed marketplace. In some of the present embodiments, such a person may still be allowed to create a non-member profile and/or to browse some of the close marketplace's listings but may not be allowed to buy items, sell items, or contact other users of the close marketplace.

As shown in stage 303, the UI 315 may receive a work email 342 followed by a selection of the submit option 345. In this example, the close marketplace may have been able to find the domain name of the person's work email in a list of approved institutions. For example, the client device 105 may send the email address 342 to the close marketplace's server(s) 250 (FIG. 2) through the network(s) 215. The close marketplace's server(s) 250 may search the approved institutions database(s) 269 and may be able to match the domain name "amn1-company" as the domain name of an approved institution. The close marketplace's server 250 may send the message 350 to the browser of the client device 105 to display.

Figure 4:
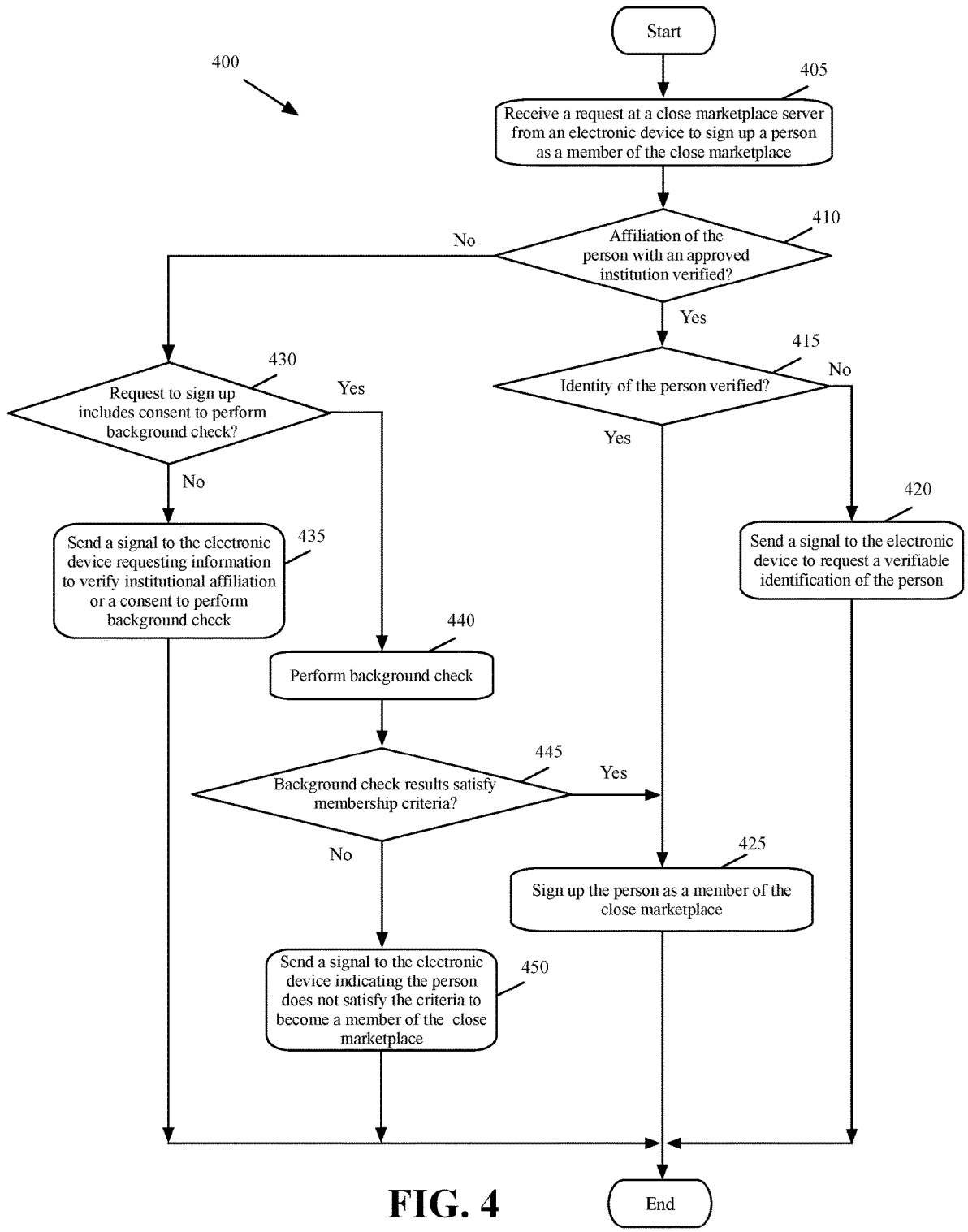
FIG. 4 is a flowchart illustrating an example process for signing up a person to the close marketplace, according to various aspects of the present embodiments.

In the example of FIGS. 3A-3B, a work email 342 is used to verify both the institutional affiliation and the identity of the person. However, the close marketplace may use other information in different embodiments to sign up a person to the marketplace. FIG. 4 is a flowchart illustrating an example process 400 for signing up a person to the close marketplace, according to various aspects of the present embodiments. The process 400, in some embodiments, may be performed by a processor of a close marketplace's server 250 (FIG. 2). The process 400 is described with reference to FIGS. 3A-3B, and 5-9.

With reference to FIG. 4, a request may be received (at block 405), at a close marketplace server from an electronic device, to sign up a person as a member of the close marketplace. For example, the client device 105 of FIG. 3A or a client device 201-205 of FIG. 2 may receive the selection of an option 311-313 of FIG. 3A followed by the selection of the option 345 to sign up a user of the client device. Alternatively, as described below with reference to FIG. 5, the client device 105 of FIG. 5 or a client device 201-205 of FIG. 2 may receive the selection of the option 315 of FIG. 5 followed by the selection of the option 530 to sign up a user of the client device. The close marketplace server 250 (FIG. 2) may then receive the request from the client device through the network(s) 210.

The request may include one or more information items that may be used to verify the institutional affiliation and/or the identity of the person that is requesting to sign up with the close marketplace. The one or more information items used to verify the institutional affiliation and the identity of the person in the example of FIG. 3A is the work email 342 of the person. As described below, the request to sign up, in some embodiments, may include other information items to verify the institutional affiliation on its own, to verify the identity on its own, or to identify the institutional affiliation and the identity together.

In some of the present embodiments, a person has to be affiliated with an approved institution and has to provide a verifiable identification in order to sign up with the close marketplace. In some aspects of the present embodiments, a person that is not affiliated with an approved institution may be provided with an option to consent to, and pass, a background check in lieu of being affiliated with an approved institution.

In some aspects of the present embodiments, a person who is signed up with the closed marketplace after being verified to be affiliated with an approved institution and providing a verifiable identification may also be required to consent to, and pass, background check in order to do certain activities in the close marketplace. For example, and without limitations, in some of the present embodiments, the close marketplace may require a person to consent to, and pass, background check if the person wants to place a personal ad (e.g., to find a date or a romantic partner) or wants to respond to a personal ad.

As another example, in some aspects of the present embodiments, members of the close marketplace may impose additional requirements (e.g., passing a background check) for persons who may want to rent their property, be their roommate, make an offer to buy a listed item, request to schedule an appointment to see a property, a room, or an item for sale, request to schedule an appointment to pick up an item, etc. In these embodiments, a person who is signed up with the closed marketplace has to consent to, and pass, background check in order to respond to ads that require a background check imposed by the listing member.

With further reference to FIG. 4, the process 400 may determine (at block 410) whether the affiliation of the person with an approved institution is verified. Although the example of FIG. 4 shows the affiliation of the person with an approved institution is checked prior to the verification of the person's identification, the affiliation and the identification may be verified together or the identification may be verified first followed by the affiliation verification.

The institutional affiliation may be checked by verifying one or more of, for example, and without limitations, a work email, a university or college email, a work telephone number, the employment history, etc., that may be included in the request to sign up. The process 400 may use any of the databases 261-271 of FIG. 2 or the services of any third party server 221-223 to verify the institutional verification.

The emails may be verified, for example, and without limitations, by sending a message to the specified email address and requesting the person to either respond to the email or to read a code included in the message and provide the code to a server 250 of the close marketplace. The telephone numbers may be verified, for example, and without limitations, by placing a call by a server of the close marketplace to the provided telephone number and receiving a confirmation back from an operator of the close marketplace that the telephone number belongs to the specified institution and is associated with the person. The telephone number and/or the work history may be verified by sending the telephone number and/or the work history from a server 250 of the close marketplace to a third party server 221-223 and receiving the verification results from the third party server.

Referring back to FIG. 4, when the process 400 determines (at block 410) that the affiliation of the person with an approved institution is not verified, the process 400 may proceed to block 430, which is described below. Otherwise, the process 400 may determine (at block 415) whether the identity of the person is verified. When the process 400 determines (at block 415) that the identity of the person cannot be verified, the process 400 may send (at block 420) a signal to the electronic device to request a verifiable identification of the person. The process may then end.

The identity of the person may be verified, for example, and without limitations, based on work email, driver license, passport, several digits of social security number, etc., which may be included in the request to sign up. The process 400 may use any of the databases 261-271 of FIG. 2 or the services of any third party server 221-223 to verify the identity of the person. Some of the present embodiments may verify the identity of the person by a process such as KYC. The identity, in some embodiments, may be verified by a person holding an identification in front of a camera of the client device, sending the identification captured by the camera from the client device to a server 250 of the close marketplace, and verifying the identification captured by the camera by the server 250 of the close marketplace. The person, for example, may be required to take a selfie and the selfie photo may be compared with the photo from the identification help by the person in front of the camera. The person may be required to make certain movements when taking the selfie to make sure the person is not using someone else's picture.

The process 400 may verify the identity of the person and the institutional affiliation together or on their own. For example, and without limitations, the identity may be verified using the person's first name and family name and the institutional affiliation may be verified using a work email. Alternatively, the work email, the work phone number, the college email, etc., may be used to simultaneously verify the person's identity and institutional affiliation.

With reference to FIG. 3A, the UI 315 may display the message 350 in stage 304 requesting the work email to be verified by clicking on a link sent to the email address. In other words, after verifying that the domain name of the email is associated with an approved institution, the user is asked to verify that the user has access to the email. The UI may also provide an option 355 to request the email to be resent.

As shown in stage 305 of FIG. 3B, the UI 315 may display a home page after receiving a touchscreen gesture or a button selection. The home page may show several icons 361-368 to activate different applications on the client device 105. As shown, the UI 315 may receive a selection of the mail application icon 366. The mail application in stage 306 may display a message 374 that is sent from the close marketplace (as shown by 371) to the person (as shown by 372) regarding the sign up to the close marketplace (as shown by 373).

The message 374 may request the user to click on the provided link 375 to verify the email and complete the sign up to the close marketplace. Once the selection of the option 375 is received, the client device 115 may send a message to the close marketplace server 250 (FIG. 2) to complete the user's sign up.

Figure 5:
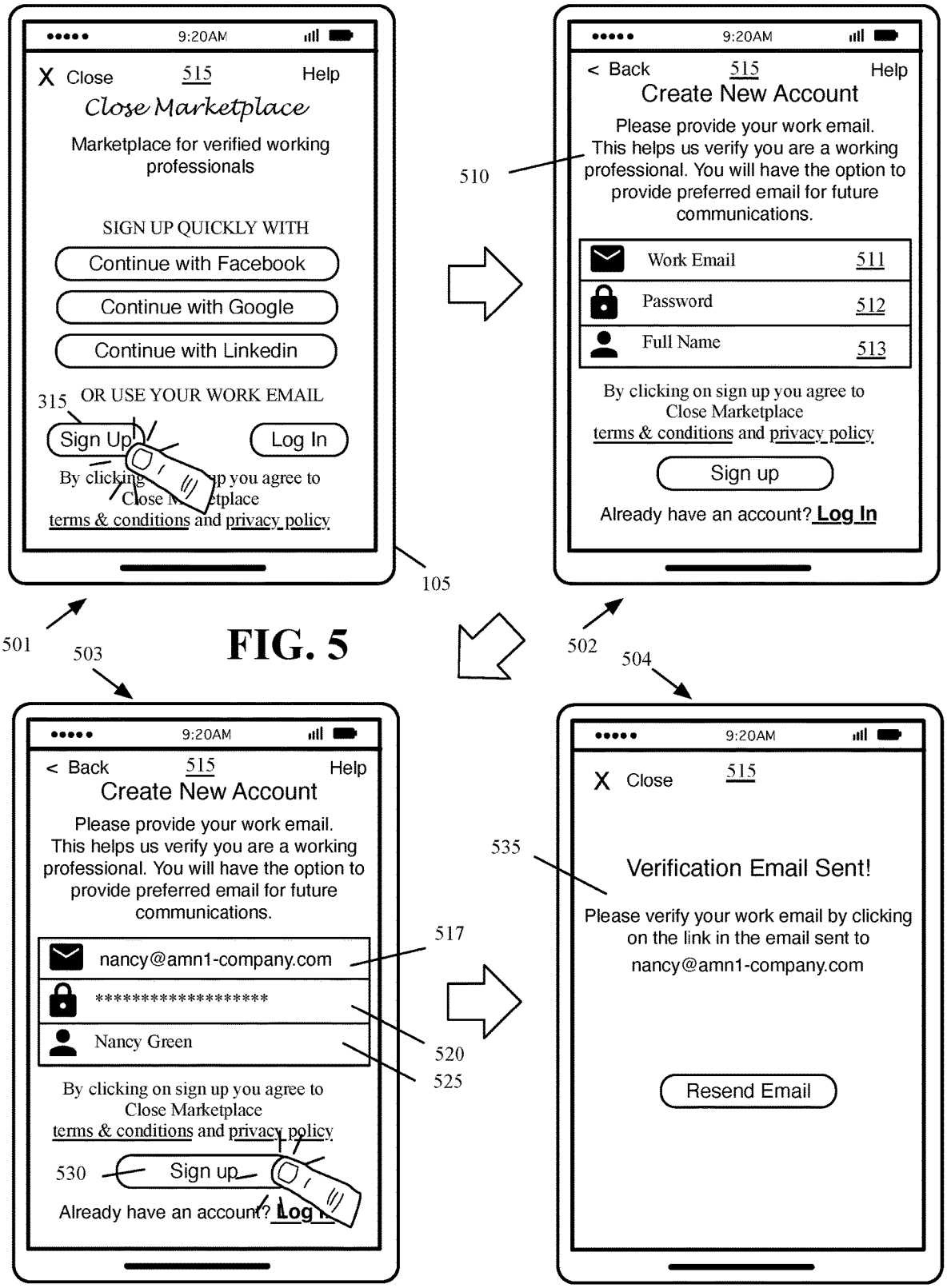
FIG. 5 is a schematic front view of an electronic device that displays a user interface for signing up or logging in to a close marketplace, according to various aspects of the present disclosure.

In the example of FIGS. 3A-3B, the user's information was transferred to the close marketplace through a social media account when the option 311 was selected. Alternatively, a person may directly sign up to the close marketplace. FIG. 5 is a schematic front view of an electronic device that displays a user interface for signing up or logging in to a close marketplace, according to various aspects of the present disclosure.

FIG. 5, as shown, includes four operational stages 501-504. In stage 501, the display 110 of the electronic device 105 may display a user interface (UI) 515 for signing up or logging in to the close marketplace. The UI 515 may show similar option as the UI 315 of FIG. 3A in stage 301. In stage 501, the UI 515 may receive a selection of the option 315 to sign up to the close marketplace.

In response, the UI 515, in stage 502, may display a message 510 to provide a work email. As shown in the example of FIG. 5, the UI 515 may provide display areas 511, 512, and 513 for entering the work email, a password, and a full name, respectively. As shown in stage 503, the UI 515 may receive a work email 517, a password 520, the full name 525 of the user, and a selection of the sign up option 530.

In stage 504, the UI 515 may display a message 535 requesting the work email to be verified by clicking on a link sent to the email address. Other stages of FIG. 5 may be similar to stages 305-306 of FIG. 3B.

Different embodiments may use different alternative methods to verify institutional affiliation. One such method is verifying the company's information on a website associated with the company's domain name used in the person's email. An example of this method is described below with reference to FIG. 6. Other alternative methods may include, for example, and without limitations, verifying employment, verifying a work telephone number, etc. The institutional affiliation may be checked by using a third party vendor's application or a close marketplace's native application.

Figure 6:
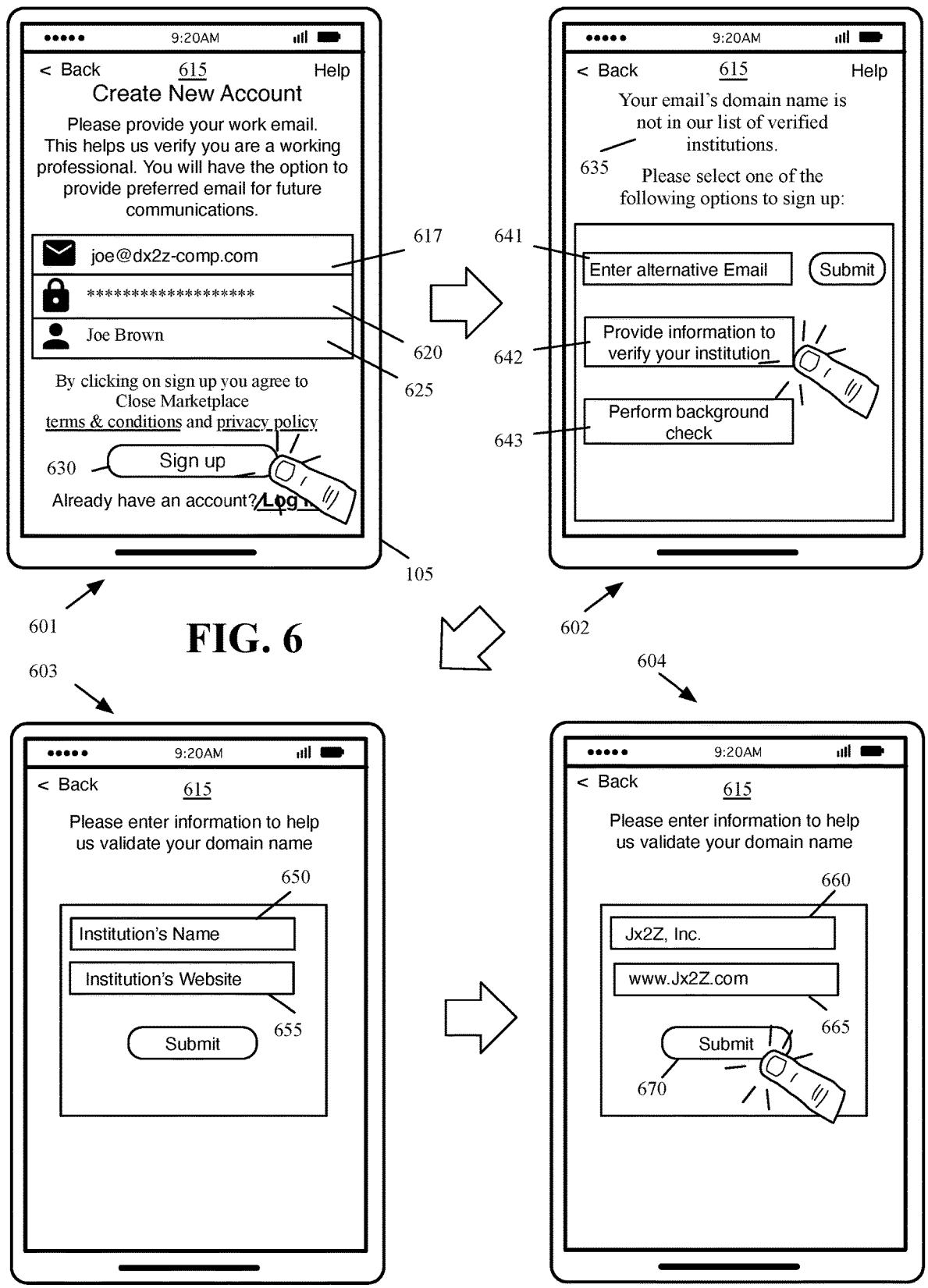
FIG. 6 is a schematic front view of an electronic device that displays a user interface for providing an option to enter alternative information to verify institutional affiliation, according to various aspects of the present disclosure.

FIG. 6 is a schematic front view of an electronic device that displays a user interface for providing an option to enter alternative information to verify institutional affiliation, according to various aspects of the present disclosure. FIG. 6, as shown, includes four operational stages 601-604. Stage 601 is similar to stage 503 of FIG. 5 and the UI 615 may be displayed in response to a selection of the sign up option 315 of FIG. 5. In stage 601 of FIG. 6, the UI 615 may receive a work email 617, a password 620, a full name 625 of the user, and a selection of the sign up option 630.

In the example of FIG. 6, however, the close marketplace is not able to associate the domain name of the work email 617 with an approved institution. For example, the client device 105 may send the email address 617 to a close marketplace's server 250 (FIG. 2) through the network(s) 215. The close marketplace's server 250 may have searched the approved institutions database(s) 269 and may not have been able to match the domain name "dx2z-comp" with the domain name of any approved institution. The close marketplace's server 250 may send the information shown in stage 602 to the browser of the client device 105 to display.

In stage 602, the UI 615 may display a message 635 indicating that the email's domain name is not in the close marketplace's list of verified institutions and may provide several alternative options 641-643 to sign up. The options may include entering an alternative email 641, providing information to verify the institution affiliation 642, and performing background check 643. The alternative email 641 may be associated with an institution where the person works. In some embodiments, the alternative email 641 may be associated with a college or university that the person is attending. As shown in this example, the UI 615 may receive a selection of the option 642 in stage 602.

In response, the UI 615, in stage 603, may display an area 650 for entering the institution's name and an area 655 for entering the institution's website. The institution may be a company where the person works. In some embodiments, the institution may be a college or university that the person attends.

In stage 604, the UI 615 may receive the name 660 of the institution, the institution's website address 665, and a selection of the submit button 670. The client device 105 may then send the institution's name and website address to the close marketplace's server(s) 250 of FIG. 2. The close marketplace's server(s) 250 may use the information to verify the institution and may then send a message to the person to indicate whether or not the institutional affiliation is verified and that they could sign up now.

Referring back to FIG. 4, when the process 400 determines (at block 415) that the identity of the person is verified, the process may sign up (at block 425) the person as a member of the close marketplace. For example, the process 400 may encrypt and store the user information in the member database(s) 261 of FIG. 2. The person may then login to the close marketplace using the log in option 182 (FIG. 1) or 320 (FIG. 3A).

With further reference to FIG. 4, when the process 400 determines (at block 410) that the affiliation of the person with an approved institution cannot be verified, the process 400 may determine (at block 430) whether the request to sign up includes a consent to perform background check. If yes, the process 400 may proceed to block 440, which is described below. Otherwise, the process 400 may send (at block 435) a signal to the electronic device requesting (e.g., as shown in stage 602 of FIG. 6) alternative information to verify the institutional affiliation or a consent to perform background check. The process 400 may then end.

When the process 400 determines (at block 430) that the request to sign up includes consent to perform background check, the process 400 may perform (at block 440) a background check for the person. In addition to, or in lieu of verifying an institutional affiliation, a potential new member who wishes to sign up to the close marketplace may be provided with an option to consent to performing a background check. The background check may include, without limitations, one or more of criminal record check, sex offender search, OFAC/Patriot Act search, known aliases search, etc. The potential member has to expressly consent to performing the background check and has to review and provide further consent for using a part or all of the background check report by close marketplace.

Figure 7:
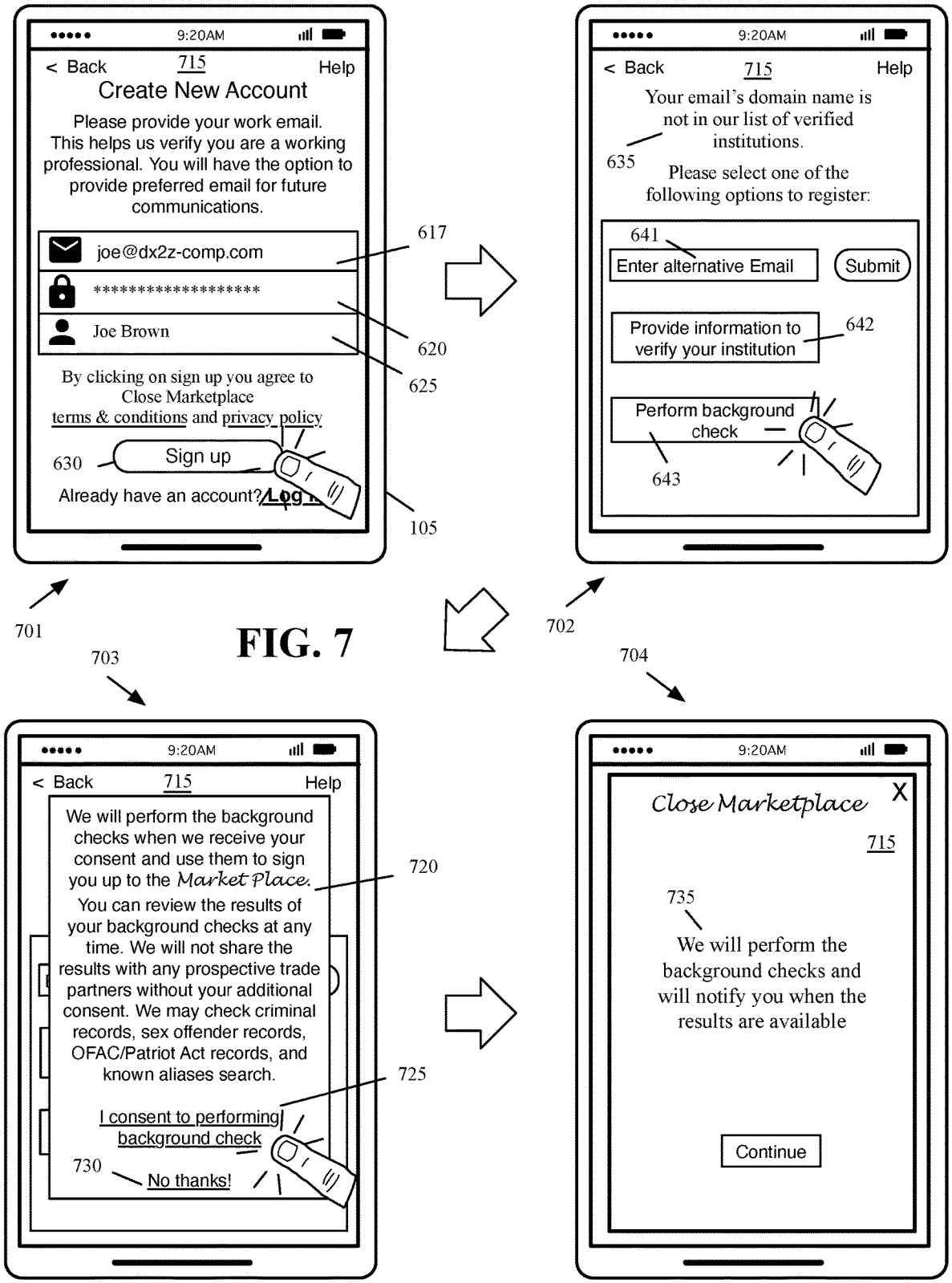
FIG. 7 is a schematic front view of an electronic device that displays a user interface for providing an option to consent to performing background check, according to various aspects of the present disclosure.

FIG. 7 is a schematic front view of an electronic device that displays a user interface for providing an option to consent to performing background check, according to various aspects of the present disclosure. FIG. 7, as shown, includes four operational stages 701-704. Stage 701 is similar to stage 601 of FIG. 6 and stage 503 of FIG. 5. The UI 715 may be displayed in response to a selection of the sign up option 315 of FIG. 5. In stage 701 of FIG. 7, the UI 715 may receive a work email 617, a password 620, the full name 625 of the user, and a selection of the sign up option 630.

In stage 702, the UI 715 may display a message 635 indicating that the email's domain name is not in the close marketplace's list of verified institutions and provides several alternative options 641-643 to sign up. In the example of FIG. 7, the UI 715, in stage 702, may receive a selection of the option 643 to perform background check.

In response, the UI 715, in stage 703, may display a message 720 that may describe what type of background checks may be performed and how the information may be used. The UI 715 may provide an option 725 to consent to performing the background check and an option 730 to decline. It should be understood that the message 720 is an example of a disclaimer and other embodiments may display other disclaimers, for example and without limitations, to indicate further limitations on the use of the background check results, fewer or more types of background checks, etc. As shown the UI 715, in stage 703 may receive a selection of the option 725 to consent to performing the background check.

In response, the UI 715 may display a message 735 in stage 704 indicating that a notification will be sent when the background check results become available. When the background check may require additional information, such as, for example, and without limitations, a social security number, previous addresses, previous employment history, etc., that the person have not previously provided, the UI 715 may request the person to provide the information.

Different embodiments may send notifications differently. For example, in some of the present embodiments (such as the embodiment described below with reference to FIG. 8), notifications may be sent to an email provided by a person as the main or preferred email. In addition to, or in lieu of, sending an email, other embodiments my use a notification feature of the close marketplace to provide notifications. For example, some embodiments may allow a visitor of the close marketplace to create a profile, even if the person has not signed up with the close marketplace. One such example was described with reference to stage 302 of FIG. 3. A visitor to the close marketplace may create a profile (e.g., by using a social media logging credentials).

As discussed below with reference to FIG. 9, such a person may be allowed to browse some of the ads on the close marketplace and receive limited notifications (e.g., regarding the success or failure of the verification of the identity, the institutional affiliation, the background check, etc.). Such a person, however, may not be able to buy, sell, or contact the members of the close marketplace without signing up.

Referring back to FIG. 4, the process 400 may determine (at block 445) whether the background check results satisfy membership criteria. If yes, the process may sign up (at block 425) the person as a member of the close marketplace (e.g., as described below with reference to FIG. 8). The process 400 may then end.

Figure 8:
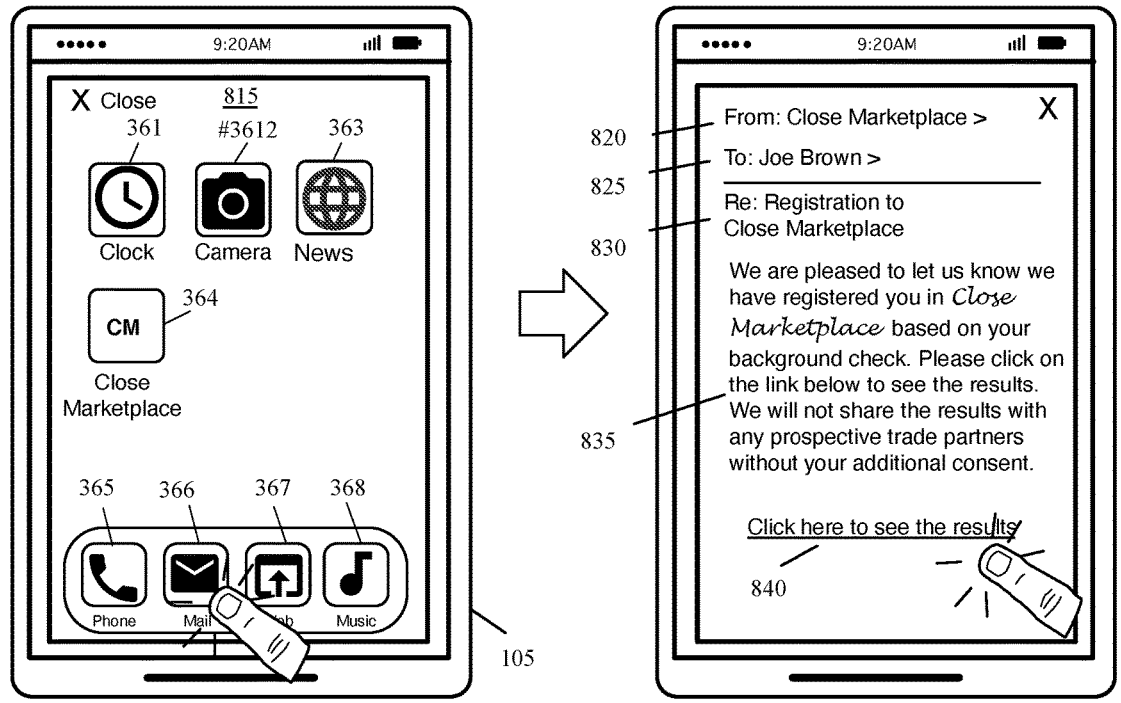
FIG. 8 is a schematic front view of an electronic device that displays a user interface for receiving one or more messages regarding the results of background check, according to various aspects of the present disclosure.
Figure 8:
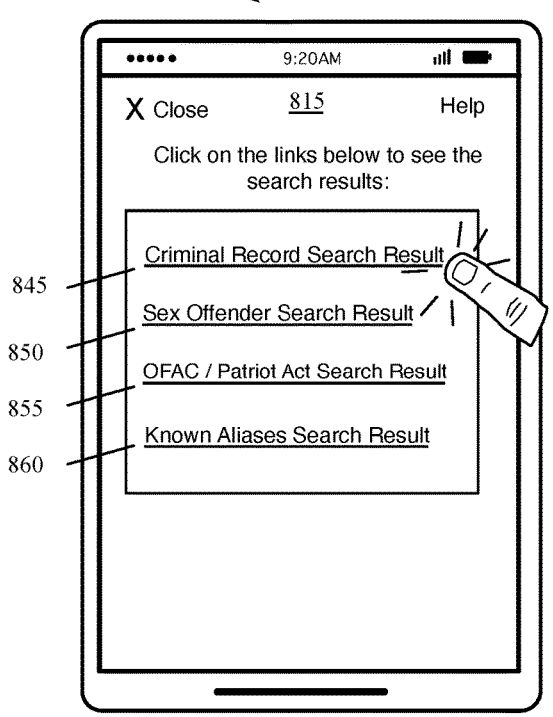
Figure 8:
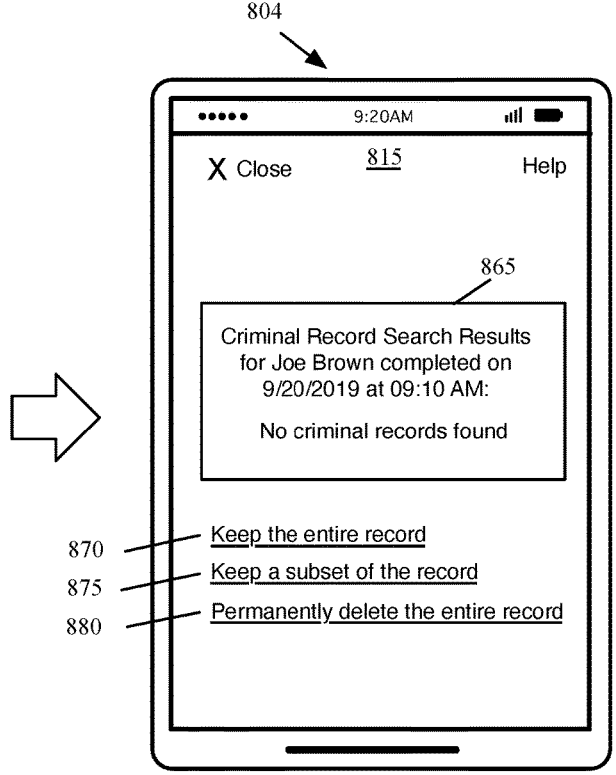

FIG. 8 is a schematic front view of an electronic device that displays a user interface for receiving one or more messages regarding the results of background check, according to various aspects of the present disclosure. FIG. 8, as shown, includes four operational stages 801-804. Stage 801 is similar to stage 305 of FIG. 3B. As shown in stage 801, the UI 815 may receive a selection of the mail application icon 366.

The mail application in stage 802 may display a message 835 that is sent from the close marketplace (as shown by 820) to the user (as shown by 825) regarding registration to the close marketplace (as shown by 830). The message 835 may inform the user that the results of the background check are available and the user is signed up to the close marketplace based on the results. The message 835 may provide a link 840 for the user to check the results. As shown, the UI 815, in stage 802, may receive a selection of the option 840 to provide the background check results.

In stage 803, the UI 815 may provide several links 845-860 to provide the results of different types of background checks. As shown in stage 803, the UI 815 may receive a selection of the link 845 (e.g., when a user of the client device 105 selects the link 845) for displaying the criminal record search results.

In response, the UI 815, in stage 804, may display the criminal record search results 865. The UI 815 may also provide an option 870 for keeping the entire record, an option 875 to keep a subset of the record (e.g., after the person reviews the record and selects the subset to be kept), and an option 880 to delete the entire record.

Referring back to FIG. 4, when a determination is made (at block 445) that the background check does not satisfy the membership criteria, a signal may be sent (at block 450) to the electronic device indicating the person does not satisfy the criteria to become a member of the close marketplace (e.g., as described below with reference to FIG. 9). The process 400 may then end.

Figure 9:
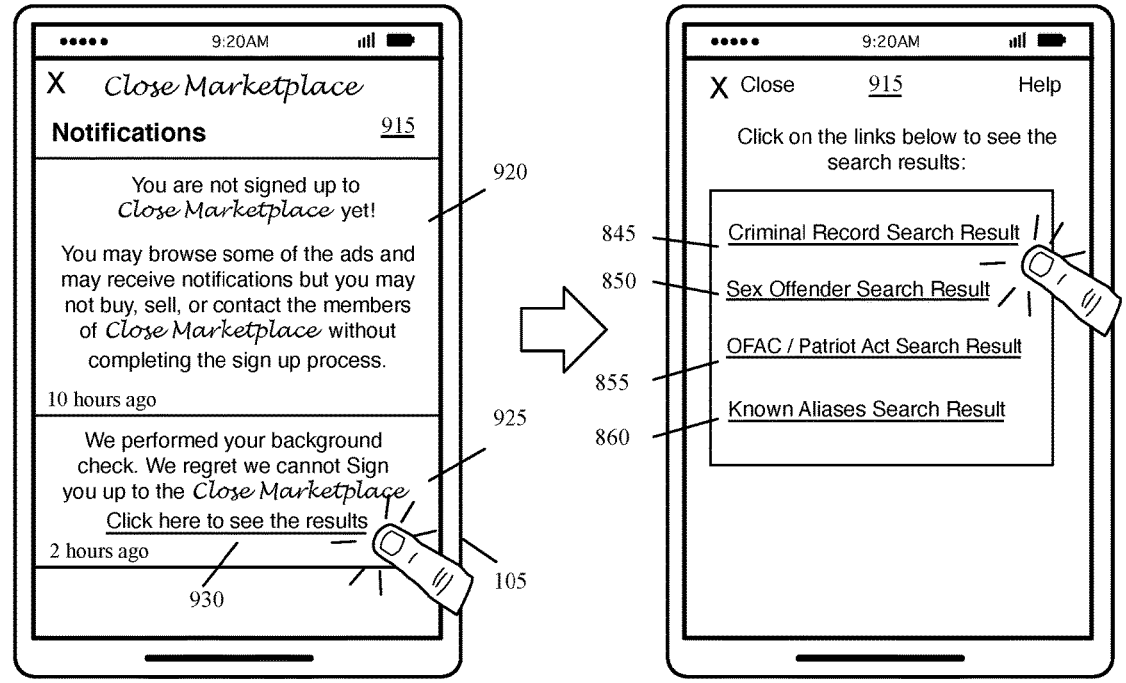
FIG. 9 is a schematic front view of an electronic device that displays a user interface for receiving one or more messages regarding the results of background check that is not acceptable for signing up the user to the close marketplace, according to various aspects of the present disclosure.
Figure 9:
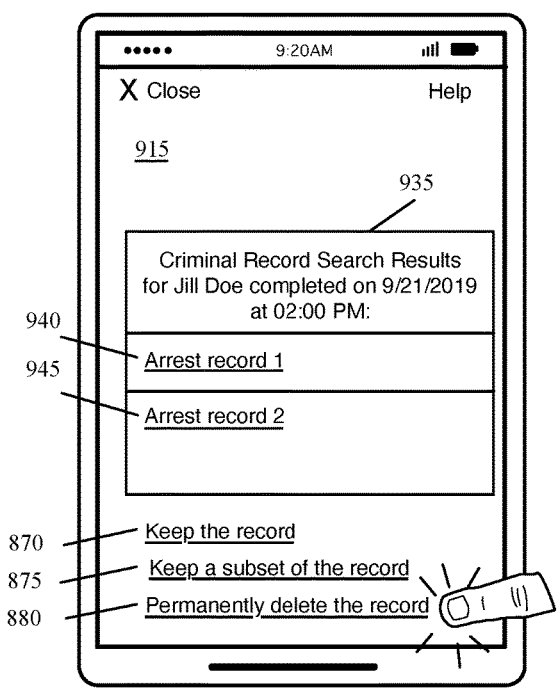
Figure 9:
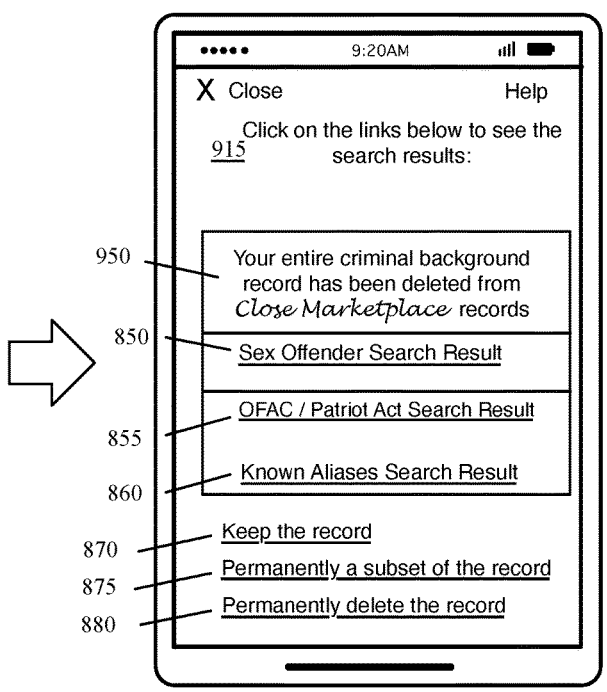

FIG. 9 is a schematic front view of an electronic device that displays a user interface for receiving one or more messages regarding the results of background check that is not acceptable for signing up the user to the close marketplace, according to various aspects of the present disclosure. FIG. 9, as shown, includes four operational stages 901-904. In stage 901, the UI 915 may display notifications for a person who has created a profile (e.g., by logging in using a social network's credentials as shown in stage 301 of FIG. 3A) but has not provided verifiable identity, verifiable institutional affiliation, and/or has not passed background check.

The UI 915, in stage 901, may display a notification 920 that the user has not signed up to the close marketplace yet and may not be able to buy, sell, or contact the members. In this example, the person who has created the profile has consented to performing a background check (e.g., as described above with reference to stages 702-703 of FIG. 7).

With reference to FIG. 9, UI 915, in stage 901, may display a message 925 (e.g., as described above with reference to block 450 of FIG. 4) that the background check has been performed and the person cannot be signed up to the closed marketplace based on the background check results. The UI 915 may provide a link 930 for the person to see the background check results. As shown, the UI 915 may receive a selection of the link 930 in stage 901.

In response, the UI 915, in stage 902, may provide several links 845-860 to provide the results of different type of background checks. As shown in stage 902, the UI 915 may receive a selection of the link 845 to provide the criminal record search results. In response, the UI 915, in stage 903, may display the criminal record search results 935.

As shown in stage 903, in this example the person who has consented to performing the background check may have several records in the person's criminal background record 935. The UI 915 may provide options 940-945 to review each individual record.

The UI 915 may provide an option 870 for keeping the entire record, an option 875 to keep a subset of the record (e.g., after the person reviews the record and selects the subset to be kept), and an option 880 to delete the entire record.

As shown in stage 903, the UI 915 may receive a selection of the option 880 to delete the entire record. In response, the UI 915, in stage 904, the close marketplace may delete the entire criminal record of the person and may display a message 950 to acknowledge the successful deletion. The person whose background check is displayed may repeat the same process to either keep the entire record, keep a subset of the record, or delete the entire record of other background search results 850-860.

Referring back to FIG. 4, the specific operations of the process 400 may not be performed in the exact order shown and described. Furthermore, the specific operations described with reference to FIG. 4 may not be performed in one continuous series of operations, in some aspects of the present disclosure, and different specific operations may be performed in different embodiments.

For instance, in some aspects of the present embodiments, a background check may not be used as an alternative to affiliation with an approved institution. In some of these embodiments, the background check may be required, in addition to affiliation with an approved institution, for example, when a person wants to buy, sell, rent, lease, and/or inspect an item, and the other party requires a background check in order to personally meet with the person. As another example, some embodiments may implement a dating website. In some of these embodiments, doing a background check may be required as one of the conditions of membership, which may be, in addition to, or in lien of, the affiliation with an approved institution, and/or identity verification.

The close marketplace may be used by the members to create listings to offer items for sale, lease, or rent. The close marketplace may be used by the members to create personal ads for finding a date or a romantic relationship. The close marketplace may be used by the members to make offers to buy, lease, or rent items. The close marketplace may be used by the members to schedule appointments with the other members to inspect and/or to pick up merchandise. The close marketplace may be used by the members to respond to personal ads by the members of the close marketplace.

Figure 10A:
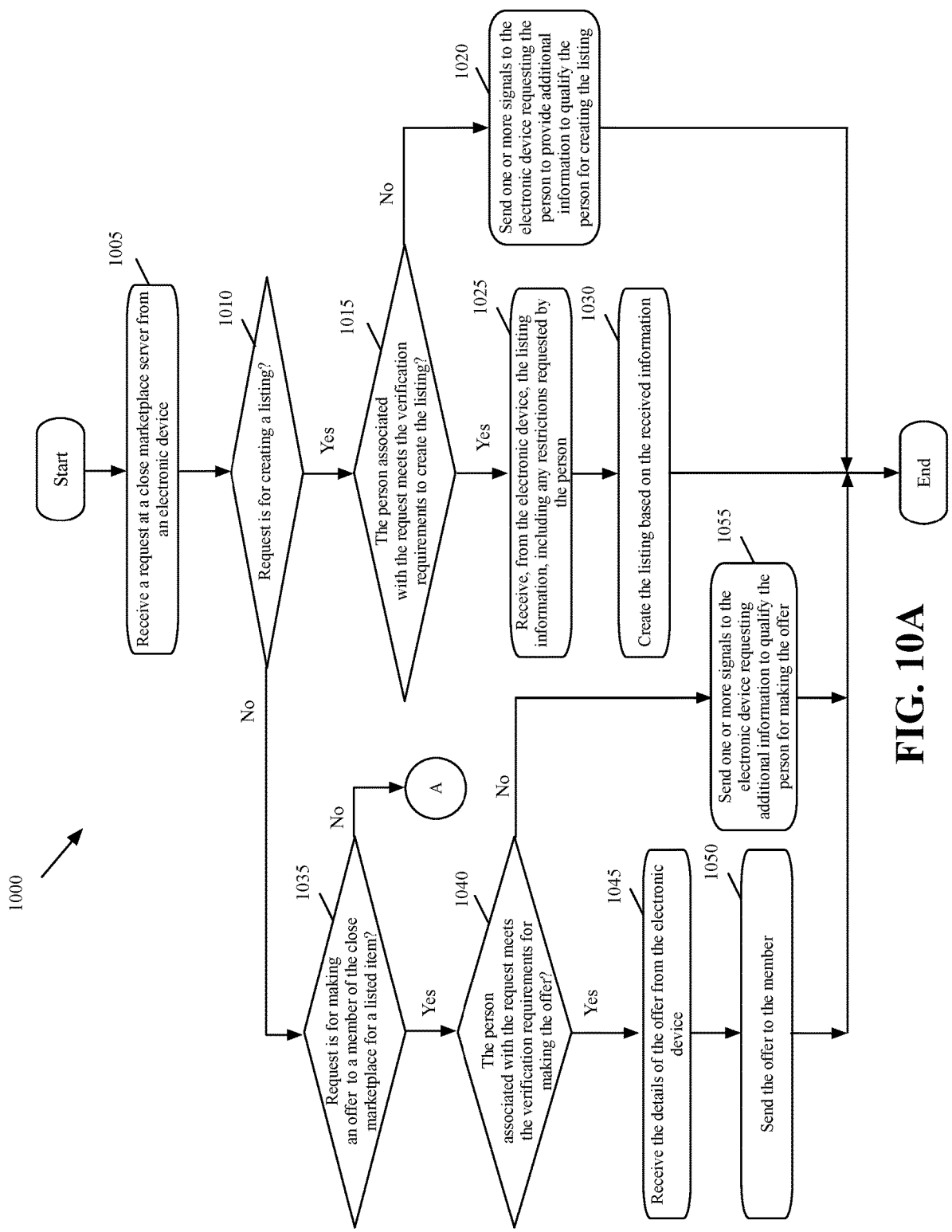
FIGS. 10A-10B illustrate a flowchart illustrating an example process for processing a request for performing an action such as buying an item, selling an item, or contacting a member of the close marketplace, according to various aspects of the present embodiments.
Figure 10B:
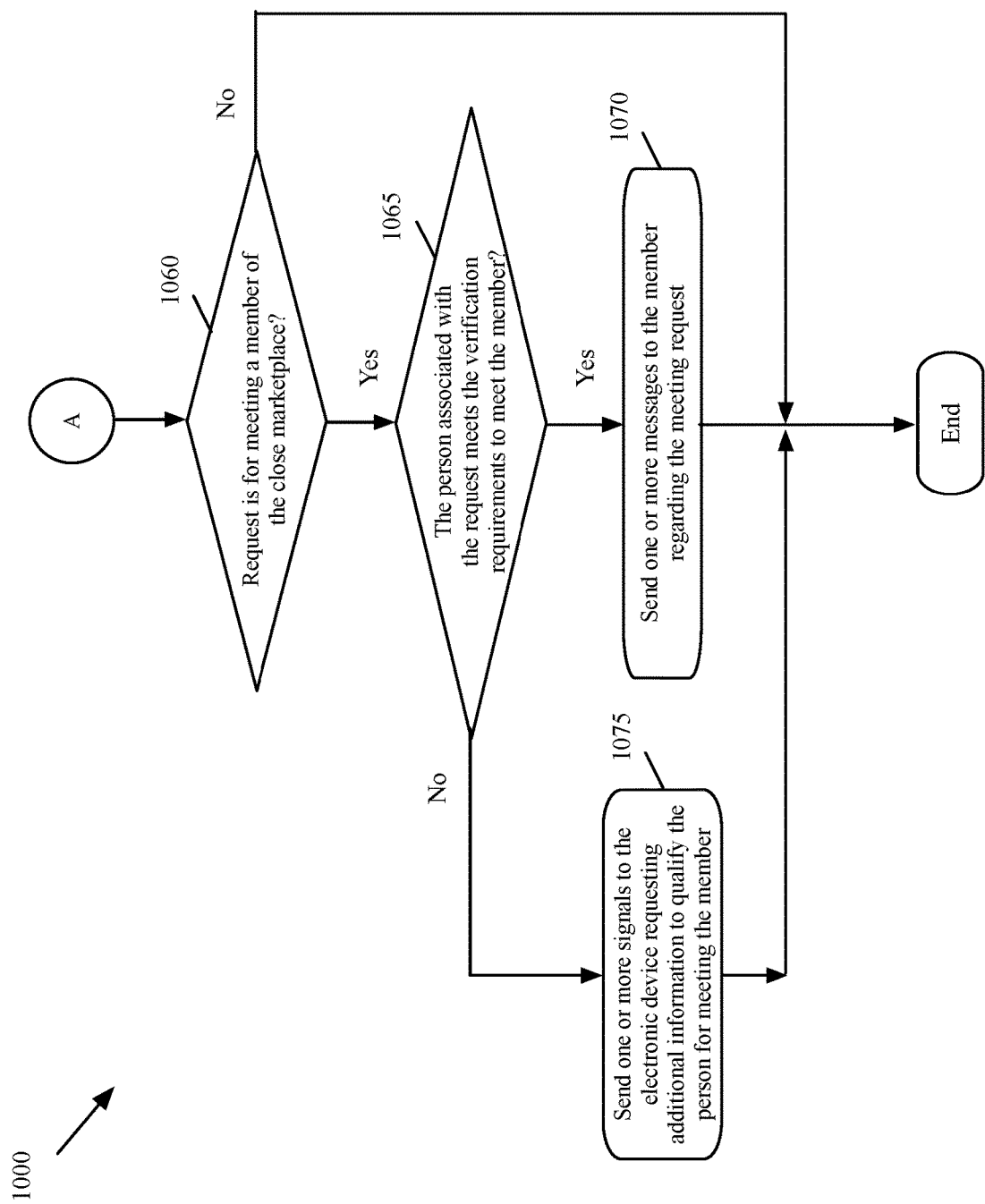

FIGS. 10A-10B illustrate a flowchart illustrating an example process 1000 for processing a request for performing an action, according to various aspects of the present embodiments. The process 1000, in some embodiments, may be performed by a processor of a close marketplace's server 250.

With reference to 10A-10B, a request may be received (at block 1005) at a close marketplace server from an electronic device. For example, a close marketplace server 250 of FIG. 2 may receive a request from a client device 201-205 to perform a transaction or to communicate with a member of the close marketplace on behalf of a person associated with the electronic device.

Next, a determination may be made (at block 1010) whether the request is for creating a listing. For example, the request may be for listing a merchandise to sell or lease, for seeking an item to buy or lease, for listing a rental premises for rent (e.g., a residence or an office space), for seeking a premises to rent, for listing a premises to share (e.g., as a roommate or officemate), for seeking a premises to share, for listing a personal ad to seek a date or romantic relationship, etc.

When it is determined (at block 1010) that the request is not for listing an item, the process 1000 may proceed to block 1035, which is described below. Otherwise, a determination may be made (at block 1015) whether the person associated with the request meets the verification requirements to create the listing. Different embodiments may require different criteria to allow a person to create a listing in the marketplace.

The criteria to allow a person to create a listing in the marketplace, in some embodiments, may include being signed up to the close marketplace, which may require passing an institutional affiliation and an identity verification. The criteria to allow a person to create a listing in the marketplace, in some embodiments, may depend on the type of listing. For example, in some embodiments, a person who wants to create a listing in the personal ad sections of the close marketplace (e.g., to find a date or a romantic relationship) has to consent to, and pass, a background check that may include checking criminal record history, checking sex offender history, checking records related to OFAC/Patriot Act, checking known aliases records, etc.

When the process 1000 determines (at block 1015) that the person associated with the request does not meet the verification requirements to create the listing, the process 1000 may send (at block 1020) one or more signals to the electronic device to request the user of the electronic device to provide additional information to qualify the user for creating the listing (as described below with reference to FIGS. 11 and 12). The process 1000 may then end.

Figure 11:
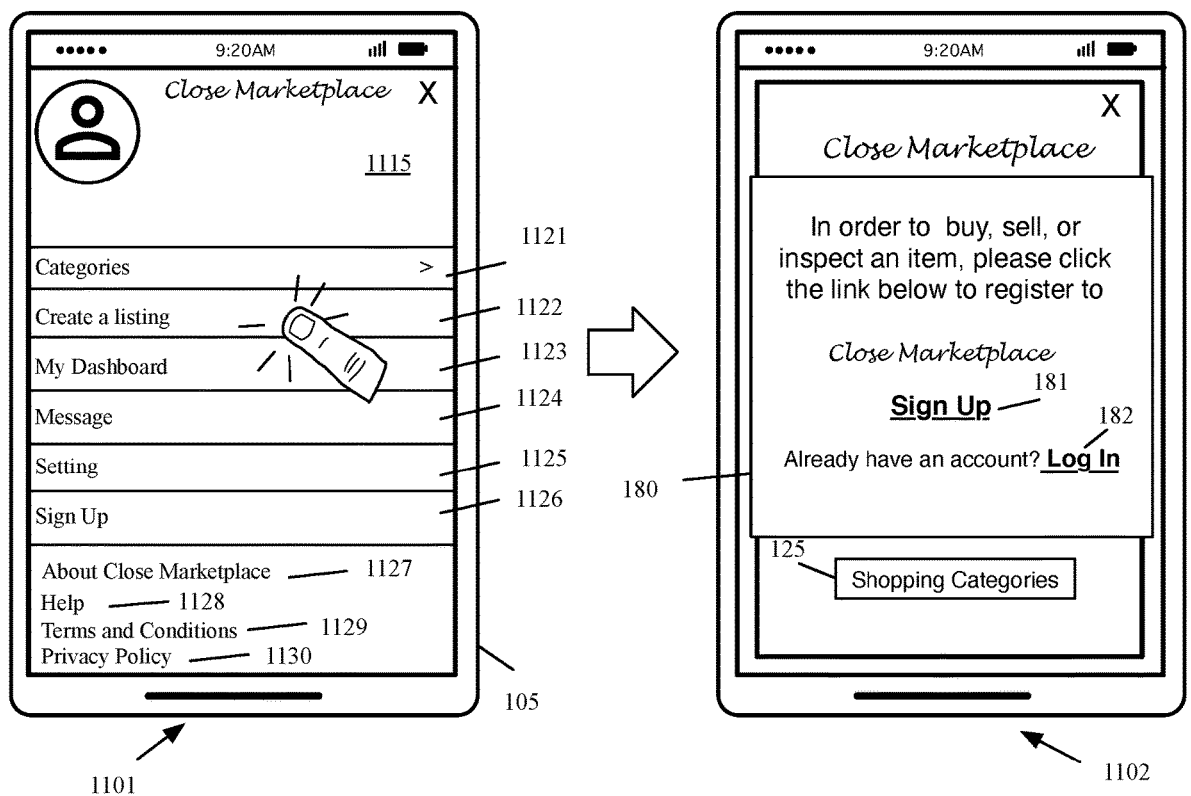
FIG. 11 is a schematic front view of an electronic device that displays a user interface for creating a listing in a close marketplace when the person who is attempting to create the listing has not signed up to the close marketplace, according to various aspects of the present disclosure.

FIG. 11 is a schematic front view of an electronic device that displays a user interface for creating a listing in a close marketplace when the person who is attempting to create the listing has not signed up to the close marketplace, according to various aspects of the present disclosure. FIG. 11, as shown, include two operational stages 1101-1102. In stage 1101, the UI 1115 may display a home page to a person that has not yet signed up to the close marketplace. The home page may display several options 1121-1130.

As shown, the UI 1115 may receive a selection of the option 1122 to create a listing. In response, the UI 1115, in stage 1102, may display a message 180 requiring the person to sign up to the close marketplace in order to create a listing. For example, the process 1000 of FIGS. 10A-10B may send (at block 1020) one or more signals to the electronic device 1105 to request the user of the electronic device to provide additional information to sign up the person. As described above with reference to FIGS. 3A-9, in order to sign up to the close marketplace, a person may have to provide verifiable institutional affiliation, verifiable identification, consent to background check, etc.

Figure 12:
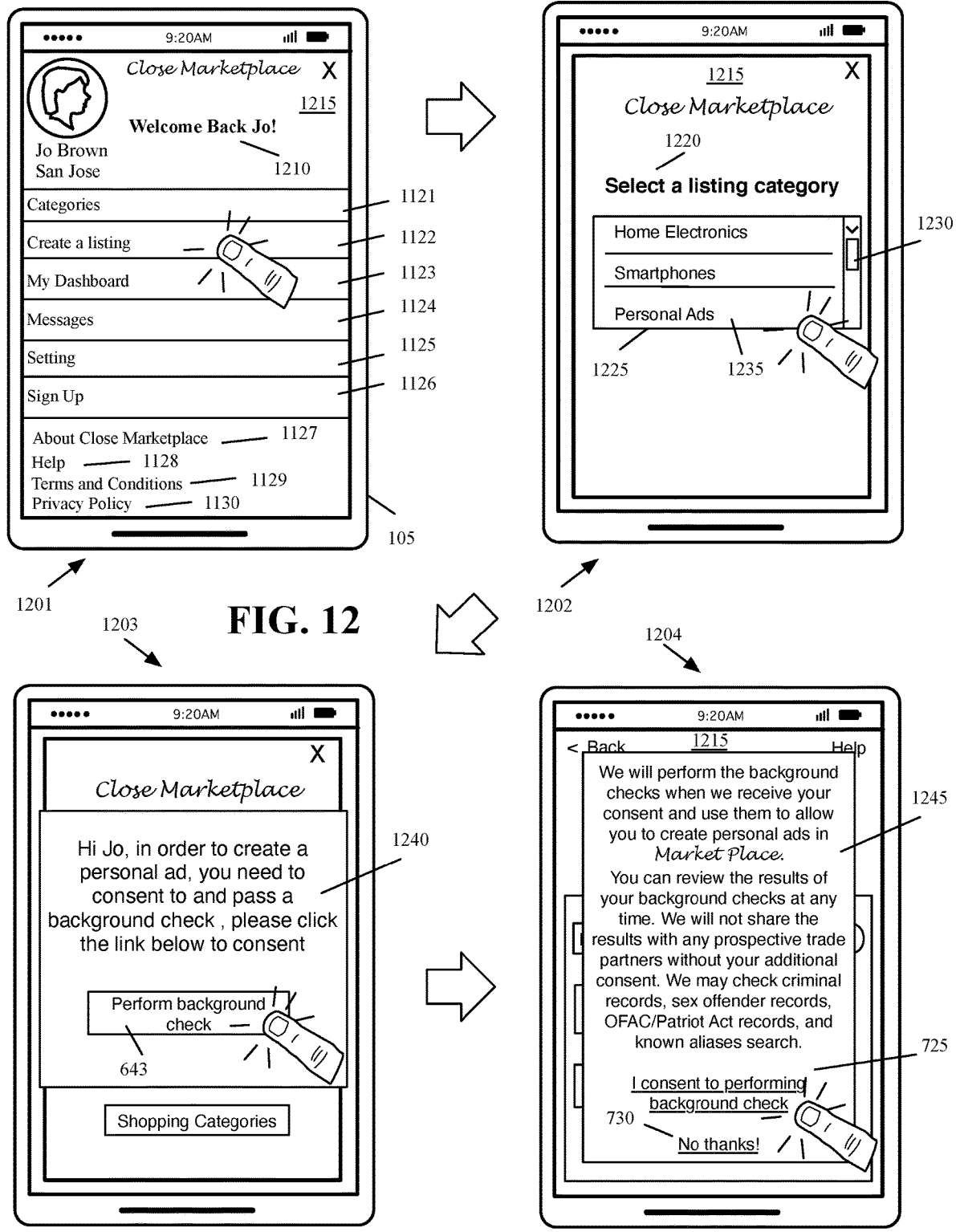
FIG. 12 is a schematic front view of an electronic device that displays a user interface for creating a listing in a close marketplace that requires additional verifications for a member, according to various aspects of the present disclosure.

FIG. 12 is a schematic front view of an electronic device that displays a user interface for creating a listing in a close marketplace that requires additional verifications for a member, according to various aspects of the present disclosure. FIG. 12, as shown, includes four operational stages 1201-1204. In stage 1201, the UI 1215 may display a greeting message 1210 to a person that has already signed up to the close marketplace, for example, by verifying institutional affiliation and identity.

The UI 1215 may display several options 1121-1130. As shown, the UI 1215 may receive a selection of the option 1122 to create a listing. In response, the UI 1215, in stage 1202, may display a message 1220 to select a listing category. The UI 1215 may display a list 1225 of the available categories, which may be scrolled by using a scroll tool 1230.

As shown, the UI 1215, in stage 1202, may receive a selection of the option 1235 to create a personal ad, for example, to find a date or a romantic relationship. In response, the UI 1215, in stage 1203, may display a message 1240 to require additional information. For example, the process 1000 of FIGS. 10A-10B may send (at block 1020) one or more signals to the electronic device 1105 to request additional information to sign up the person.

The close marketplace, in some embodiments, may require additional criteria to allow a member to place a personal ad or to respond to a personal ad. The requirements may include, for example, and without limitations, providing constant to, and passing, a background check that may include criminal records check, sex offender records check, OFAC/Patriot Act record check, known aliases check, etc. Accordingly, the close marketplace, in some embodiments, may implement a hierarchical level of verifications for the initial sign up, based on the type of a listing a person wants to create or access, based on a requirement set by a member that the person wants to meet or do a transaction, etc.

With reference to FIG. 12, the UI 1215, in stage 1203, may receive a selection of the option 643 to perform background check. In response, the UI 1215, in stage 1204, may display a message 1245 that may describe what type of background checks may be performed and how the information may be used. The UI 1215 may provide an option 725 to consent to performing the background check and an option 730 to reject it. It should be understood that the message 1245 is an example of a disclaimer and other embodiments may display other disclaimers, for example and without limitations, to indicate further limitations on the use of the background check results, fewer or more types of background checks, etc. Further stages of FIG. 12 may be similar to stage 704 of FIG. 7 and one or more stages of FIGS. 8 and 9, depending on whether or not the person passes the background check.

Referring back to FIG. 10A, when a determination is made (at block 1015) that the person associated with the request meets the verification requirements to create a listing, the person may be allowed to provide information to create a listing. At block 1025, the listing information, including any restrictions requested by the person (e.g., as described below with reference to stages 1303-1304 of FIG. 13) may be received from the electronic device associated with the requesting person. The listing based on the received information may then be created (at block 1030). For example, the listing may be created as described below with reference to FIG. 13. The process 1000 may then end.

Figure 13:
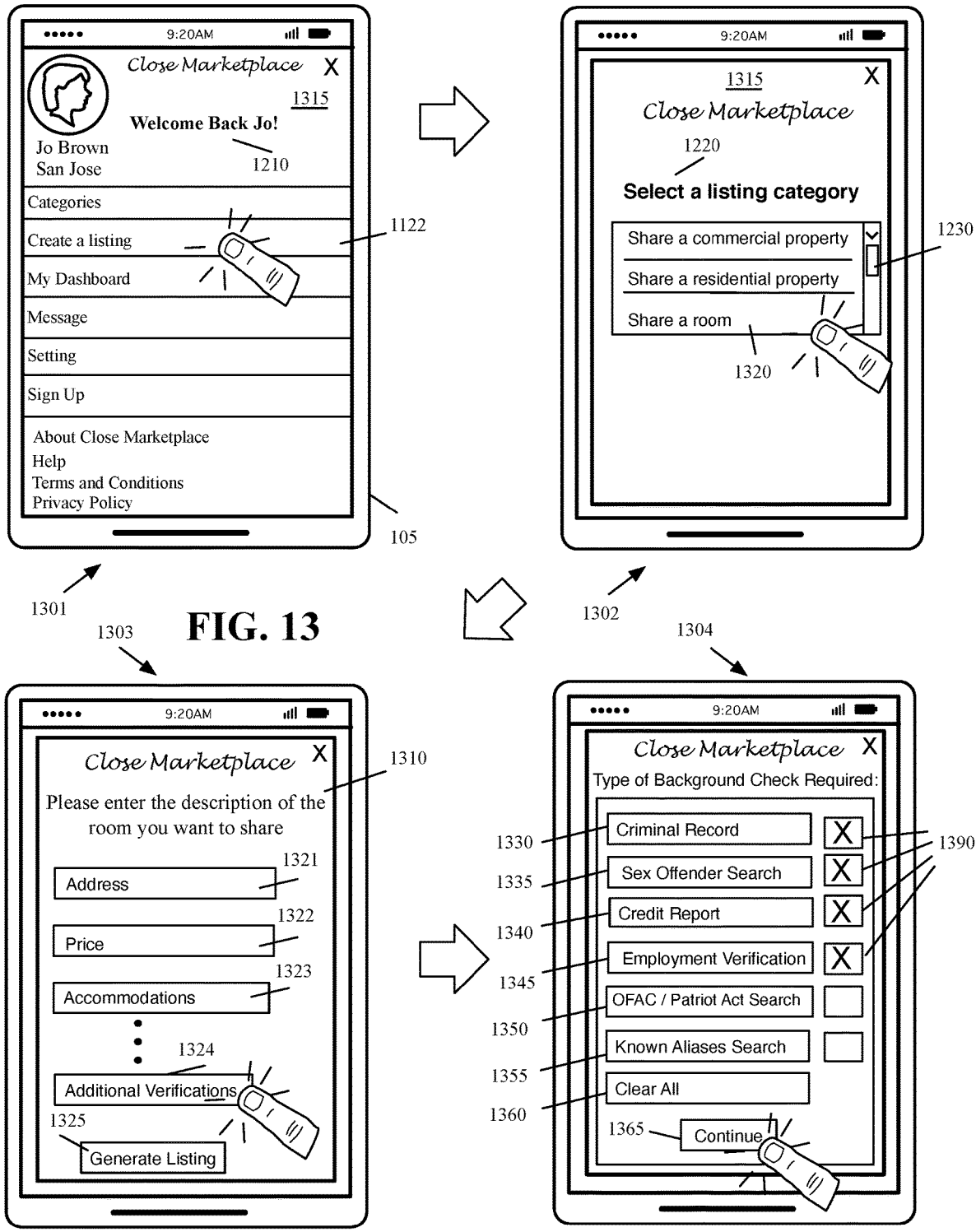
FIG. 13 is a schematic front view of an electronic device that displays a user interface for creating a listing in a close marketplace and requiring additional verification requirements for responding to the listing, according to various aspects of the present disclosure.

FIG. 13 is a schematic front view of an electronic device that displays a user interface for creating a listing in a close marketplace and requiring additional verification requirements for responding to the listing, according to various aspects of the present disclosure. FIG. 13, as shown, include four operational stages 1301-1304. In stage 1301, the UI 1315 may display a greeting message 1210 to a person that has already signed up to the close marketplace, for example, by verifying identity and institutional affiliation.

Stage 1301 is similar to stage 1201 of FIG. 12. In stage 1302, the UI 1315 may receive a selection of an option 1320 to create a listing for sharing a room. In response, the UI 1315, in stage 1303, may display a message 1310 to receive the description of the room the person wants to share. The description may include, for example, and without limitations, the address 1321, the asking price 1322, the type of accommodations 1323, additional verification required by the lister 1324, and an option 1325 to generate the listing.

As shown in stage 1303, the UI 1315 may receive a selection of the option 1324 to enter additional verification requirement. In response, the UI 1315, in stage 1304, may display a list of additional requirements that the lister may select. A member that responds to the listing has to pass the additional verification requirements selected by the lister. Accordingly, some of the present embodiments, implement a hierarchical level of verification that may change depending on the sign up requirements, requirements for responding to a particular listing, requirements for generating a particular type of listing (e.g., a personal ad), etc.

In the example of FIG. 13, the person who has a room to share may have selected additional verification requirements 1330-1345, as shown by a marks 1390. The UI 1315, in stage 1304, may receive a selection of the option 1365 to continue receiving information for the listing. Any person who may want to share the listed room may have to perform the additional background checks 1330-1345 in order to be considered by the person who is creating the listing.

Referring back to FIG. 10A, when it is determined (at block 1010) that the request is not for a listing, a determination may be made (at block 1035) whether the request is for making an offer to a member of the close marketplace for a listed item. For example, the request may be made to make an offer for an item listed for sale, the request may be made in response to an ad for sharing or renting a room, the request may be made in response to an ad for sharing or renting office space, etc.

When a determination is made (at block 1035) that the request is not for making an offer to a member of the close marketplace for a listed item, the process 1000 may proceed to block 1060, which is described below. Otherwise, a determination may be made (at block 1040) whether the person associated with the request meets the verification requirement for making the offer. If not, one or more signals may be sent (at block 1055) to the electronic device of the person to request additional information (e.g., as described below with reference to FIGS. 14A-14B) to qualify the person for making the offer. The process 1000 may then end.

Figure 14A:
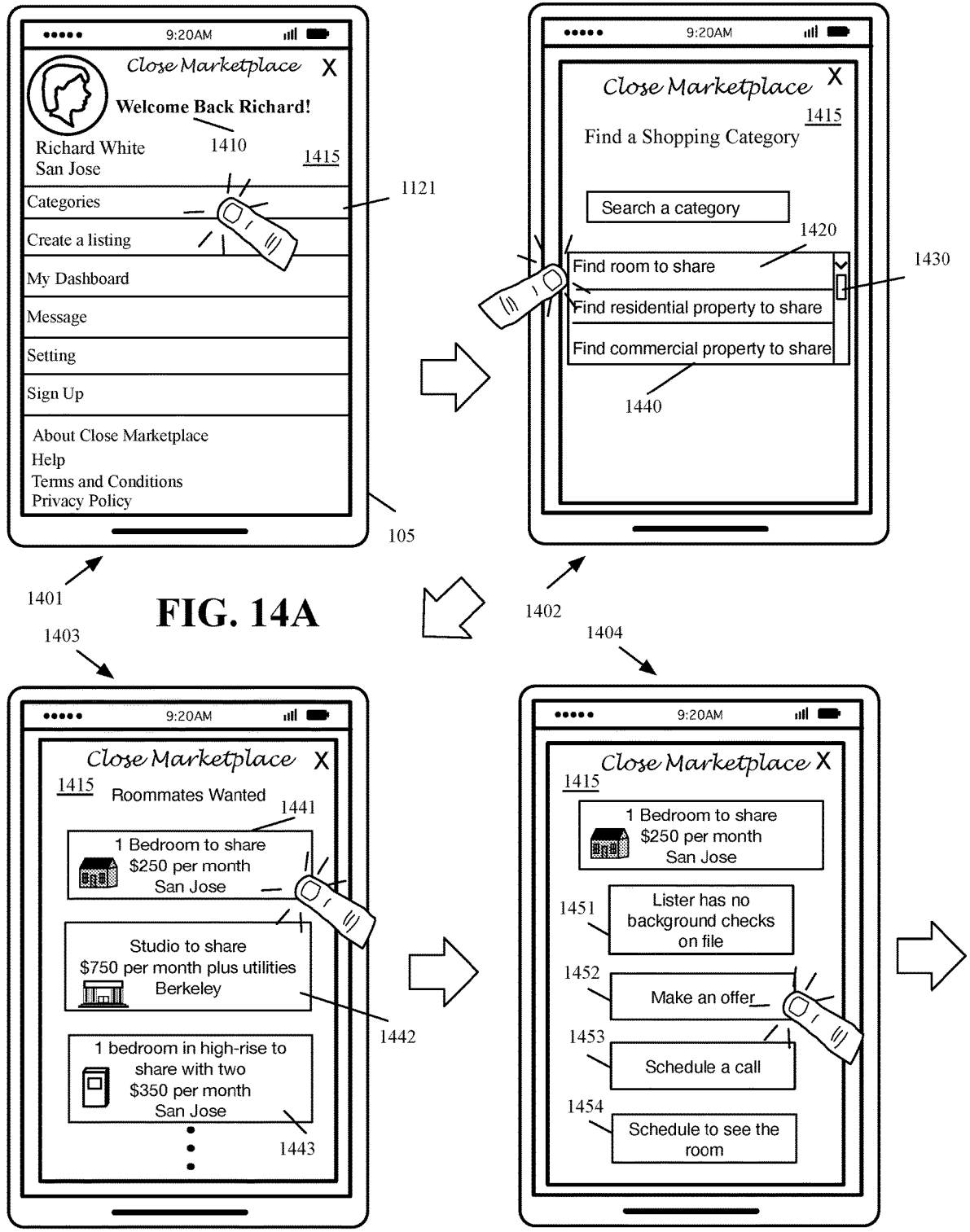
FIGS. 14A-14B illustrate a schematic front view of an electronic device that displays a user interface for finding a room to share in a close marketplace and satisfying additional verification requirements for responding to selected listings, according to various aspects of the present disclosure.
Figure 14B:
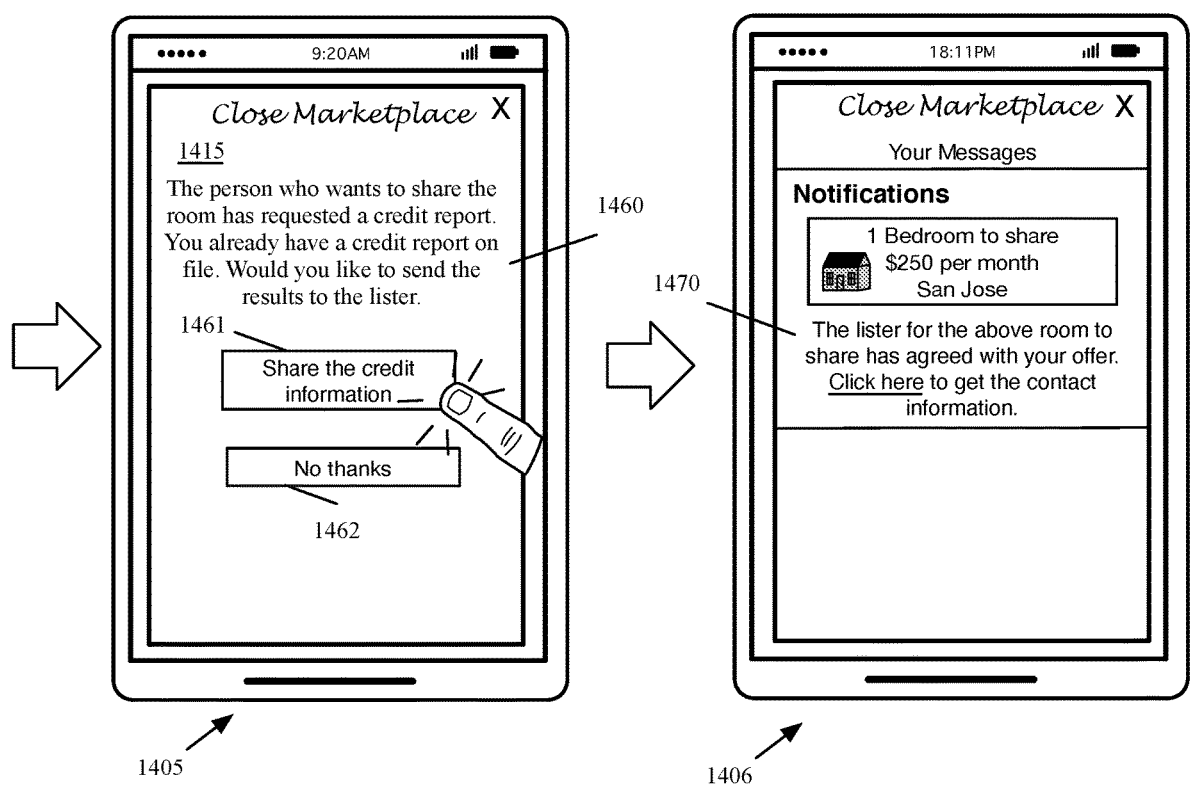

FIGS. 14A-14B illustrate a schematic front view of an electronic device that displays a user interface for finding a room to share in a close marketplace and satisfying additional verification requirements for responding to selected listings, according to various aspects of the present disclosure. FIGS. 14A-14B, as shown, include six operational stages 1401-1406. In stage 1401, the UI 1215 may display a greeting message 1410 to a member who has logged in to the close marketplace. As shown, the UI 1415, in stage 1402, may receive a selection of the option 1121 to search different categories in the close marketplace.

In response, the UI 1415, in stage 1402 may display a list 1440 of the available categories, which may be scrolled by using a scroll tool 1430. As shown, the UI 1415, in stage 1402, may receive a selection of the option 1420 to find a room to share. In response, the UI 1415, in stage 1403, may display listings 1441-1443 of several rooms that are listed to share.

As shown, the UI 1415, in stage 1403, may receive a selection of a listing 1441. In response, the UI 1415, in stage 1404 may display additional information 1451-1454 regarding the room that is available to share. In this example, the UI 1415, in stage 1404, may receive a selection of the option 1452 to make an offer for the room to share.

In response, the UI 1415, in stage 1405, may display a message 1460 requiring additional verifications in order to send the offer to the lister. For example, the process 1000 of FIG. 10B may send (at block 1055) one or more signals signal to the electronic device 1105 to request additional information to qualify the person for making the offer.

In the example of FIG. 14B, the lister for the room to share may have asked an applicant to provide a credit report. As shown, the UI 1415, in stage 1405, may display the message 1460 asking for consent to share credit information that the close marketplace has on file for the applicant. The UI 1415 may provide an option 1461 to consent and an option 1462 to decline sharing the credit report.

In the example of FIG. 14B, the UI 1415, in stage 1405, may receive a selection of the option 1461 to consent to sharing of the credit information. In some aspects of the present embodiments, the close marketplace may only share a subset of a person's credit report (e.g., the FICO score or any subset of the credit report that the person has previously consented to share) with other members. The FICO (or Fair Isaac Corporation) score is a measure of a credit risk of a person and is available through major consumer reporting agencies in the United States.

The UI 1415 may then receive the offer and send a message to the lister of the room to share regarding the offer. As shown in stage 1406, the UI 1415, at a later time, may send a notification 1470 to the person indicating that the lister has agreed with the offer. The close marketplace, in some embodiments, may also facilitate a peer to peer method of payments to facilitate eCommerce transactions, rental transactions, etc., where the funds are transferred from the bank or credit card account of a buyer to the bank account of seller. In this example, the UI 1415 may facilitate the lister and the renter to directly transfer funds from, for example and without limitations, a bank account or a credit card of the person who wants to rent the room to a bank account of the person who is offering the room to share.

Referring back to FIGS. 10A-10B, when the determination is made (at block 1040) that the person associated with the request meets the verification requirement for making the offer, the process 1000 may allow the person to provide the details for the offer (e.g., the price, the quantity needed, etc.). The details of the offer may be received (at block 1045), from the electronic device. The offer may then be sent (at block 1050) to the member. The process 1000 may then end.

When a determination is made (at block 1035) that the request is not for making an offer to a member of the close marketplace for a listed item, a determination may be made (at block 1060) whether the request is for meeting a member of the close marketplace. If not, the process 1000 may end. Otherwise, a determination may be made (at block 1065) whether the person associated with the request meets the verification requirements to meet the member (e.g., as described below with reference to FIGS. 15A-15B).

Figure 15A:
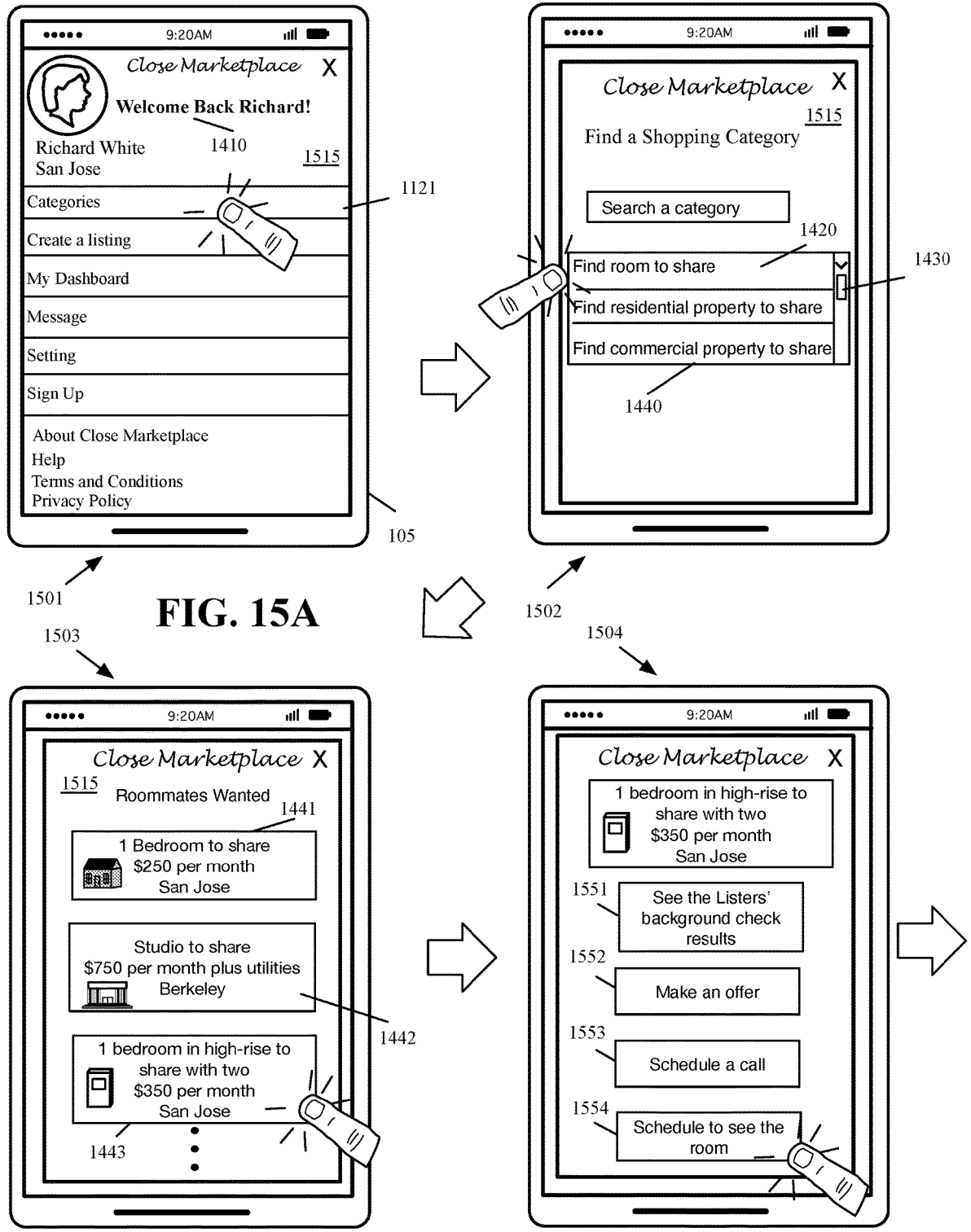
FIGS. 15A-15B illustrate a schematic front view of an electronic device that displays a user interface for finding a room to share in a close marketplace and satisfying additional verification requirements for meeting a member of the close marketplace, according to various aspects of the present disclosure.
Figure 15B:
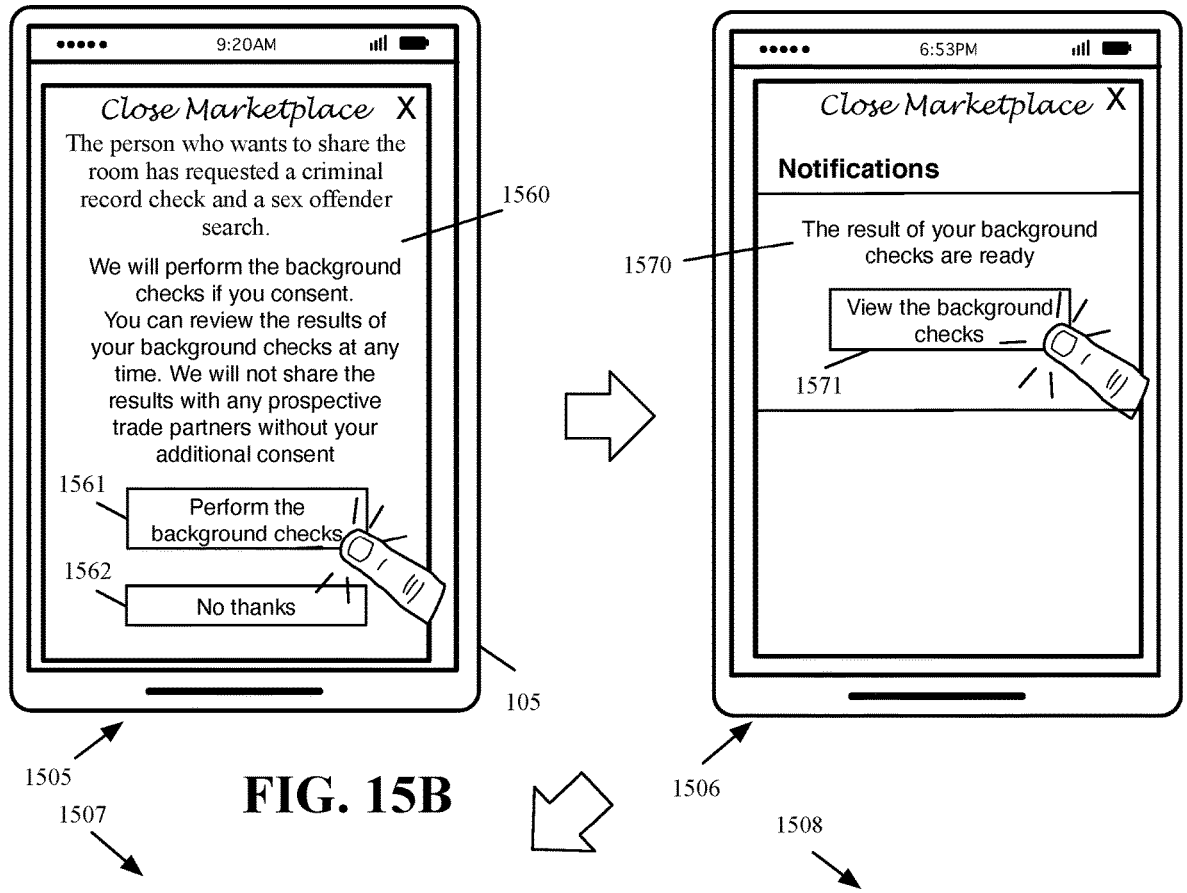
Figure 15B:
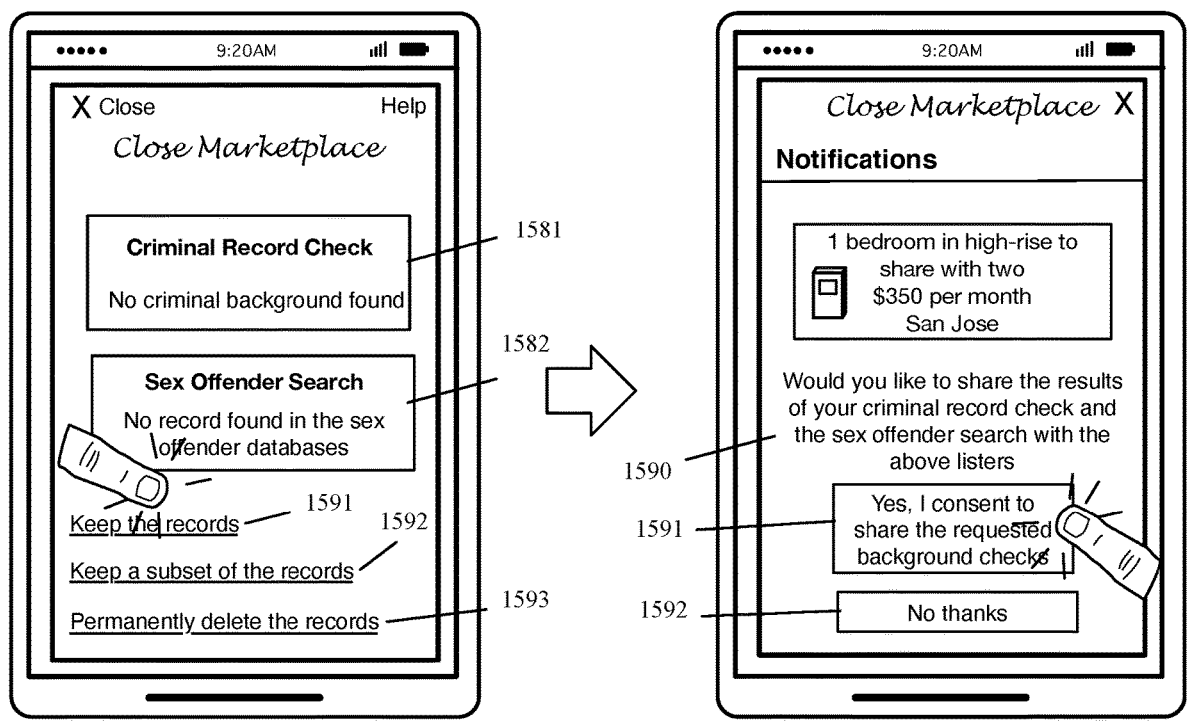

FIGS. 15A-15B illustrate a schematic front view of an electronic device that displays a user interface for finding a room to share in a close marketplace and satisfying additional verification requirements for meeting a member of the close marketplace, according to various aspects of the present disclosure. FIGS. 15A-15B, as shown, include eight operational stages 1501-1508. Stages 1501-1502 are similar to stages 1401-1402 of FIG. 14A. In stage 1503, the UI 1515 may receive a selection of the option 1443 to see the details of a listing for a room to share.

In response, the UI 1515, in stage 1504 may display additional information 1551-1554 regarding the room that is available to share. In this example, the UI 1515, in stage 1504, may receive a selection of the option 1554 to make schedule a meeting to see the room.

Referring back to FIGS. 10A-10B, when a determination is made (at block 1065) that the person associated with the request does not meet the verification requirements to meet the member, one or more signals may be sent (at block 1075) to the electronic device requesting additional information to qualify the person for meeting the member.

For example, in stage 1505 of FIG. 15B, the close marketplace server 250 of FIG. 2 may send the message 1560 to the client device 105. In response, the UI 1515 of the client device 105 may display the message 1560 indicating that the person who wants to share the room has requested criminal record check and se offender record check for the applicants. The UI 1515 may display an option 1561 to consent to performing the background check and an option 1562 to decline.

In the example of FIG. 15B, the UI 1515 may receive a selection of the option 1561 to consent. The UI 1515, at a later time, may generate a notification 1570 for the person regarding the results of the background checks. In this example, the UI 1515 may receive a selection of the option 1571 to display the background check results.

In response, the UI 1515, in stage 1507, may display the results 1581-1582 of the background checks. The UI 1515 may provide an option 1591 to keep the records, an option 1592 to keep a subset of the record, and an option 1593 to permanently delete the records. In this example, the UI 1515, in stage 1507, may receive a selection of the option 1591 to keep the records.

At a later time, the UI 1515 may generate a notification 1590 requesting for consent to share the results of the background check with the lister of the room to share. The UI 1515 may provide an option 1591 to give consent and an option 1592 to decline. In this example, the UI 1515 may receive a selection of the option 1591 to consent sharing the results of the background checks.

Referring back to FIGS. 10A-10B, when the determination is made (at block 1065) that the person associated with the request meets the requirements to meet the member, one or more messages may be sent (at block 1070) to the member regarding the meeting request. The process 1000 may then end. For example, the UI 1515 of FIGS. 15A-15B may send a message to the close marketplace server 250 of FIG. 2 to send a message to the lister of the room to share to request for an appointment for the applicant. Once two members satisfy the requirements for, and consent to, meeting each other, the close marketplace may facilitate the meeting by providing the contact information of at least one of the members to the other. The contact information may be selected based on one or both members' preferences. For example, and without limitations, the contact information may be an email, a private chat room, a telephone number, etc.

Some embodiments may provide a close marketplace for professionals with verified affiliations with approved institutions to facilitate buying, selling, or leasing tangible items without leaving their home. The close marketplace may facilitate picking up items that are for sale or lease from the sellers' or the lessors' homes, providing the items to prospective buyers or lessees for inspection, delivering the sold or leased items to buyers or lessors, picking up and returning the leased items to the lessors, picking up the sold items that buyers want to return and returning the items to the sellers, and/or facilitating the transfer of funds between the parties to a transaction.

Figure 16A:
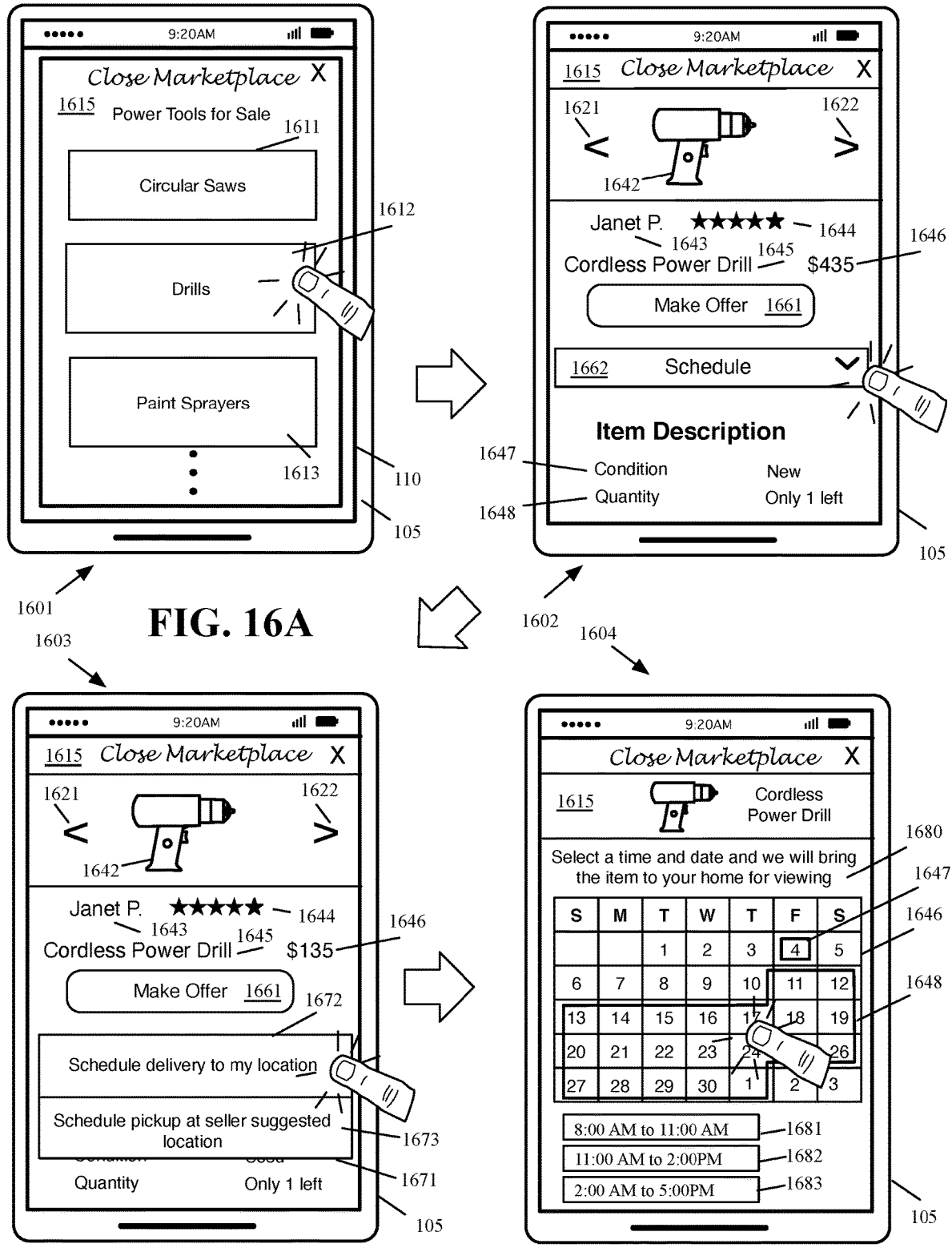
FIGS. 16A-16B illustrate a schematic front view of electronic devices that display a user interface for allowing buyers, sellers, lessors, and lessees to make transactions without a need for leaving their homes to fulfill the transaction, according to various aspects of the present disclosure.
Figure 16B:
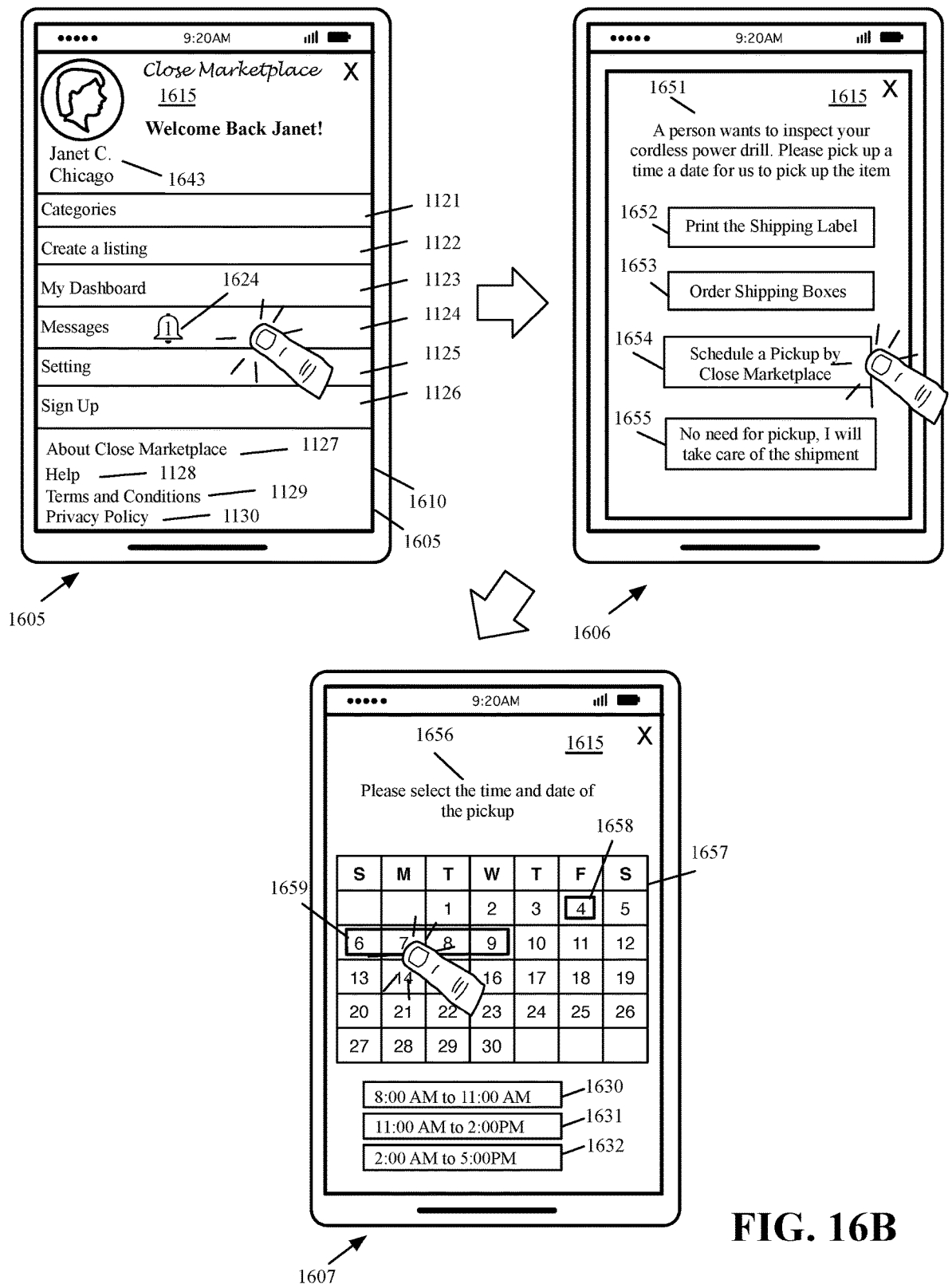

FIGS. 16A-16B illustrate a schematic front view of electronic devices that display a user interface for allowing buyers, sellers, lessors, and lessees to make transactions without a need for leaving their homes to fulfill the transaction, according to various aspects of the present disclosure. FIGS. 16A-16B, as shown, include seven operational stages 1601-1606.

In stage 1601, the display 110 of the electronic device 105 may display a UI 1615 of a close marketplace. The UI 1615 in stage 1601 may display a list of items 1611-1613 for sale for a person that has already signed up to the close marketplace. Although the example of FIGS. 16A-16B show tangible items that are for sale, the same process may be applicable to tangible items that are for lease. For example, the same items 1611-1613 may be listed for sale, for lease, or a combination thereof. As shown, in stage 1601, the UI 1615 may receive a selection of the item 1612 to display drills.

In response, the UI 1615, in stage 1602, may display one or more drills that are listed for sale and/or lease. In this example, the picture 1642 of a drill that is listed in the close marketplace is displayed. Other information, such as, for example, and without limitations, the user name 1643 of the seller, the ranking 1644 of the seller, the drill's type and/or description 1645, the asking price 1646, the item's condition 1647, and the available quantity 1648 may be displayed. Other listed drills may be displayed by scrolling through a list using the scroll tools 1621 and 1622.

The UI 1615 may display an option 1661 to make an offer to buy or lease the item or select an option 1662 to schedule a meeting with the seller/lessor. In this example, a selection of the drop down option 1662 to schedule to view the item is received in stage 1602.

In response, a menu 1671 may be displayed in stage 1603 that provides an option 1672 to schedule delivery to the buyer's or lessees' location (e.g., to bring the item to the buyer's or lessees' home for viewing) and an option 1673 to schedule pickup at a seller suggested location (e.g., when the seller or the lessor has a designated location, such as a home, a business, a showroom, etc., for viewing the item). In the example of FIG. 16A, a selection of the option 1672 to schedule viewing the item at the buyer's location is received.

As shown, in stage 1604, the UI 1615 may display a message 1680 and a calendar 1646. The message 1680 may indicate that the buyer may select a time and date for inspecting the item at the buyer's home. In this example, the calendar 1646 may identify the current date 1647. The calendar may display one or more windows 1648 of one or more days and one or more time windows 1681-1683 for scheduling an appointment for the item to be brought to the buyer or lessee's home to inspect. As described below with reference to stages 1605-1607, the close marketplace may schedule an appointment with the seller or lessor for the item 1641 to be picked up and brought to the buyer or lessor's home without either of the buyer/lessee or the seller/lessor have to leave their homes to facilitate the inspection or to do the transaction.

Different embodiments may display different types of calendars (e.g., and without limitations, daily, weekly, monthly, bimonthly, annual, etc.), may display different time windows, may require the buyer/lessee to select more than one day and/or more than one time window for scheduling the appointment.

Once the buyer/lessee schedules an appointment, the close marketplace may contact the seller/lessor to schedule a pick up. In some embodiments, the close marketplace may allow the seller/lessor to arrange for a pickup before a potential buyer/lessee is identified. The close marketplace may, for example, and without limitations, store the picked up items in a warehouse until a buyer/lessee is identified and accepted by the seller/lessor.

The seller/lessor may also arrange for a pickup after a buyer/lessor is identified who wants to either buy or inspect the item that the seller wants to sell or lease. The UI 1615, in some embodiments, may inform the buyer/lessor that the delivery schedule is tentative and would be subject to a pick up confirmation by the seller.

Stage 1605 shows the UI 1615 displayed on the display 1610 of an electronic device of the seller/lessor 1643 of the item 1645. As shown, the UI 1615, in stage 1605, may display several options 1121-1130. The option 1124 may allow any messages received for the person 1643 through the close marketplace to be displayed. As shown, the icon 1624 may be badged with the number of unread messages. In stage 1605, a selection of the option 1124 may be received.

In response, the UI 1615, may display a message 1651 indicating that a person wants to inspect the cordless power drill that was listed by the seller/lessor 1643. The UI 1651 may display several options 1652-1655 to allow the seller/lessor 1643 to ship the item to the buyer/lessee. In this example, the seller/lessor may select the option 1652 to print the shipping label. The seller/lessor may select the option 1653 to order shipping boxes. The seller/lessor may select the option 1654 to schedule a pickup by the close marketplace. The seller/lessor may select the option 1655 to take care of the shipment without assistant from the close marketplace.

As shown, the seller/lessor may select the option 1654, in stage 1606, to schedule a pickup by the close marketplace. In response, the UI 1615, in stage 1607 may display a message 1656 and a calendar 1657. The message 1656 may indicate that the seller/lessor may select a time and date for the item to be picked up. In this example, the calendar 1657 may identify the current date 1658 and may display one or more windows 1659 of one or more days and one or more time windows 1681-1683 for scheduling an appointment for the item to be picked up.

The close marketplace, in some localities, may have personnel to pick up and/or to deliver items. The close marketplace personnel may use third party services for at least a portion of the distance between the seller/lessee's and the buyer/lessor's homes. For example, and without limitations, the close marketplace personnel may pick up an item and deliver the item to the postal service or a parcel delivery service to deliver the item to the destination. The close marketplace may, therefore, facilitate nationwide selling/leasing of items for the sellers/lessors and saving them the time to go to a postal or parcel carrier to ship items. In the example of FIGS. 16A-16B when the buyer/lessee selects the option 1672 in stage 1603 and the seller/lessor selects the option 1654 in stage 1606, both the buyer/lessee and the buyer/lessee may perform the transaction without having to leave their home (or place of business) for arranging the inspection or the delivery of items.

The example of FIGS. 16A-16B is also applicable when the buyer/lessee may want to buy or lease and item without inspection. In such a case, the item may be picked up from the seller/lessor home and delivered to the buyer/lessee. A similar process may be performed to return a leased item to a lessor and/or to return an item that a buyer wishes to return within a permissible time period.

As described above, some embodiments may provide a close network for finding dates and romantic relationships. The network membership may require the proof of affiliation with an institution in a list of approved institutions, proof of identity, and background check. The close network, in some embodiments, may provide an option for the members to require additional qualifications for potential dates and romantic partners.

Figure 17A:
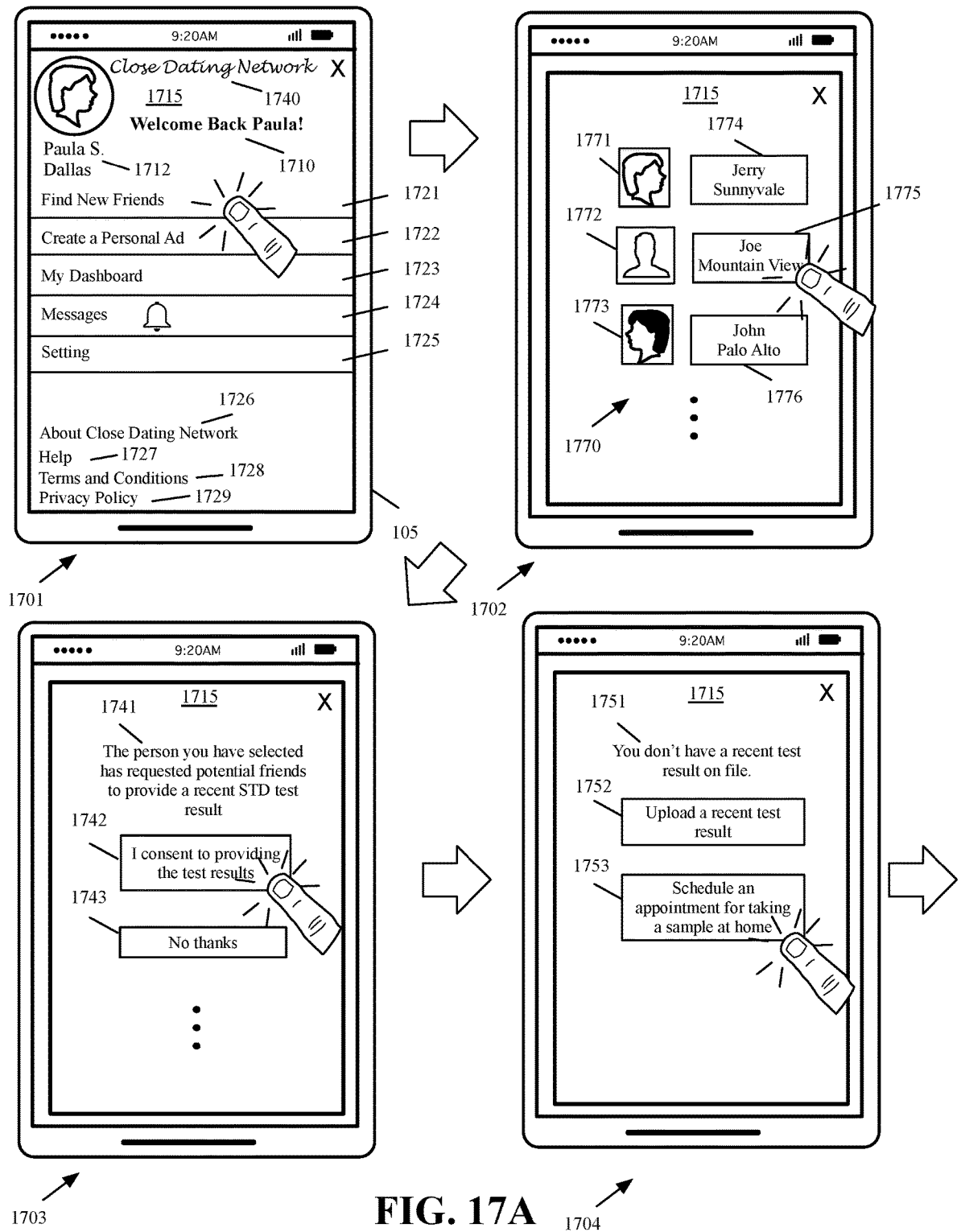
FIGS. 17A-17B illustrate a schematic front view of an electronic device that displays a user interface for allowing the members of a dating website to ask for additional qualifications before meeting a potential new friend, according to various aspects of the present disclosure.
Figure 17B:
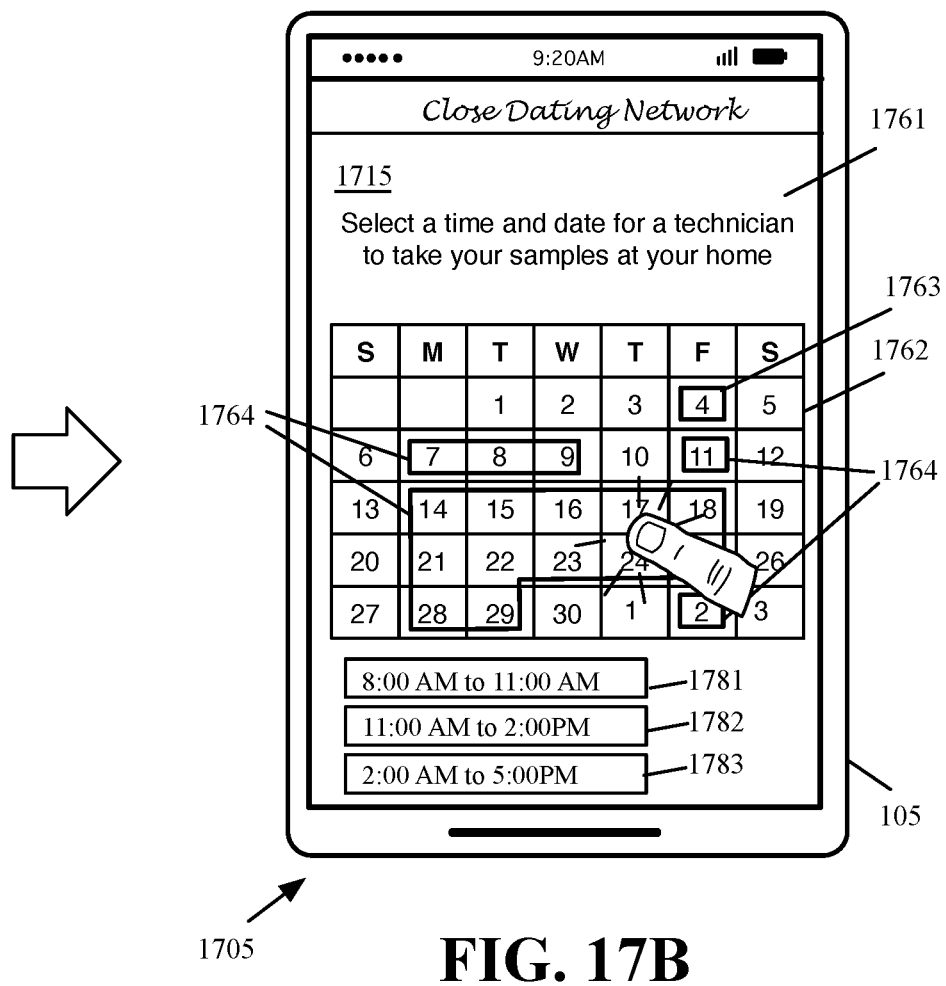

FIGS. 17A-17B illustrate a schematic front view of an electronic device that displays a user interface for allowing the members of a dating website to ask for additional qualifications before meeting a potential new friend, according to various aspects of the present disclosure. FIGS. 17A-17B, as shown, includes five operational stages 1701-1705.

In stage 1701, the UI 1715 may display a greeting message 1710 to a member 1712 that has already signed up to a close dating network 1740, for example, by verifying institutional affiliation, verifying identity, and performing one or more types of background checks (e.g., and without limitations, as described above with reference to FIGS. 12-13). The close dating network, therefore, lowers the risk for the strangers who may want to find dates and establish romantic relationships with each other through a close circle of professionals. As described below, the close dating network 1740 may provide options for the members to require further restrictions before they meet new friends and start new relationships.

In stage 1701, the UI 1715 may display several options 1721-1729. The options may include looking at personal ads to find new friends 1721, creating a personal ad 1722, viewing the member's dashboard 1723, viewing messages 1724 received from the close dating network and/or other members of the close dating network, setting up the member's preferences 1725, information about the close dating network 1726, reading help topics 1727, reading the terms and conditions of using the close dating network 1728, and reading the privacy policy 1729.

As shown, in stage 1701, the UI 1715 may receive a selection of the option 1721 to read personal ads and find new friends. In response, the UI 1715, in stage 1702, may display a list 1770 of several members of the close dating network. The list may show picture 1771-1773, the name 1774-1776, and/or a message (not shown) from each listed member. The list 1770 may be displayed, for example, and without limitations, based on preferences that the member 1712 have previously been set up. The members, in some embodiments, may setup their preferences for finding friends using an option such as the option 1725 shown in stage 1701.

The UI 1715, in stage 1702, may receive a selection of the member 1775. In response, the UI 1715 may display a message 1741 indicating any additional conditions that have to be satisfied before the member 1712 may contact the selected member 1775. In this example, the processor of one of the servers 250 (FIG. 2) may search the databases 250 (e.g., and without limitations, the members database(s) 261 and/or the personal ads database(s) 267) to determine the preferences and/or the additional conditions set by the member 1775. In this example, the member 1775 may require results for health check tests such as tests for sexually transmitted diseases (STDs), tests for one or more contagious pathogens (e.g., and without limitations coronavirus, Ebola, etc.), and so on. The close dating network makes sure the request for the health check results satisfies the privacy and other laws of the federal government, the privacy and other laws of the states and localities where each member 1712 and 1775 live, as well as the close dating network privacy rules and bylaws for requesting personal information.

As show in stage 1703, the UI 1715 may display a message 1741 indicating that the selected person has requested potential friends to provide a recent STD test results. The UI 1715 may provide an option 1742 to receive consent for providing the test results and an option 1743 to refuse providing the test results. In this example, the UI 1715 may receive a selection of the option 1742 in stage 1703.

In response, the UI 1715 may display a message 1751, in stage 1704, indicating that the member 1712 does not have a recent test result on file. The UI 1715 may display an option 1752 for uploading a recent test result and an option 1753 for scheduling an appointment for taking a sample at home. The sample may be blood, saliva, urine, etc., that may be needed for the test(s). In some embodiments, the close dating network may include personnel and/or may use third party personnel to go to members' homes to collect samples for different health tests.

In the example of FIGS. 17A-17B, the UI 1715 may receive a selection of the option 1753 to schedule an appointment. In response, the UI 1715 may display a message 1761 and a calendar 1762 in stage 1705. The message 1761 may indicate that the member may select a time and date for setting an appointment for a technician to cone to the member's home to take samples for the test(s). In this example, the calendar 1762 may identify the current date 1763 and may display one or more windows 1764 of several days and one or more time windows 1781-1783 for scheduling the appointment.

Once the sample(s) are taken, the test results may be provided to the member 1712, for example, by sending a message to the member. The member may review the test results, may decide to keep the test results, may decide to keep a subset of the test results, or delete the test results, as described above with reference to FIGS. 12-13. The member 1712 may decide which portion of the test results (if any) may be shared with the member 1775.

Figure 18:
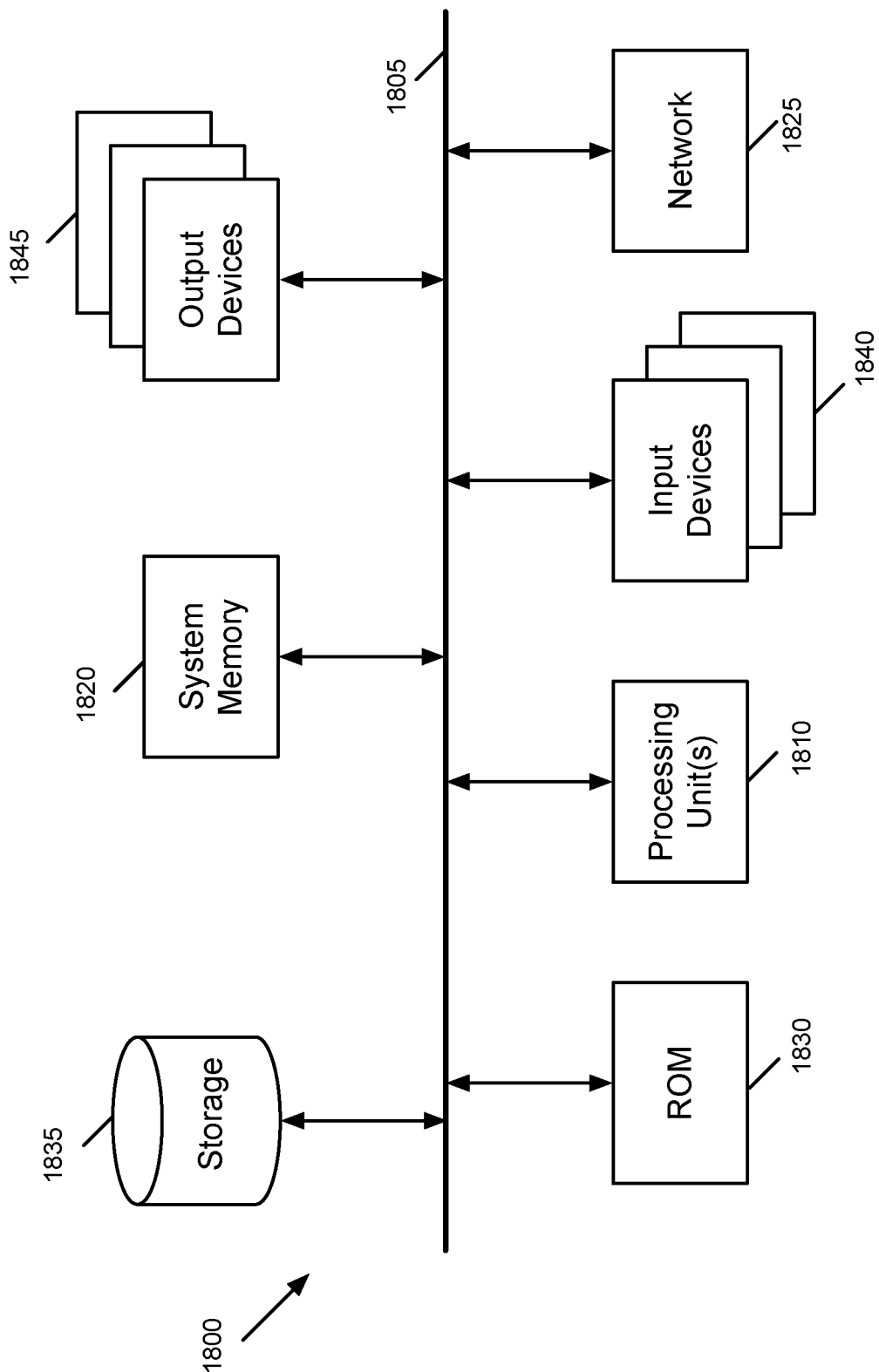
FIG. 18 is a functional block diagram illustrating an example electronic system, according to various aspects of the present disclosure.

FIG. 18 is a functional block diagram illustrating an example electronic system 1800, according to various aspects of the present disclosure. With reference to FIG. 18, some embodiments of the invention, such as for example, and without limitations, the electronic devices, the servers, the client devices, etc., described above, may be implemented using the electronic system 1800. The electronic system 1800 may be used to execute any of the processes, methods, controls, or operating system applications described above. The electronic system 1800 may be a computer (e.g., a desktop computer, personal computer, tablet computer, server computer, mainframe, a blade computer etc.), a phone (e.g., a smartphone), a personal digital assistant (PDA), or any other sort of electronic device. Such an electronic system may include various types of computer readable media and interfaces for various other types of computer readable media. The electronic system 1800 may include a bus 1805, processing unit(s) 1810, a system memory 1820, a read-only memory (ROM) 1830, a permanent storage device 1835, input devices 1840, and output devices 1845.

The bus 1805 may collectively represent all system, peripheral, and chipset buses that communicatively connect the numerous internal devices of the electronic system 1800. For example, the bus 1805 may communicatively connect the processing unit(s) 1810 with the read-only memory 1830, the system memory 1820, and the permanent storage device 1835.

From these various memory units, the processing unit(s) 1810 may retrieve instructions to execute and data to process in order to execute the processes of the invention. The processing unit(s) may be a single processor or a multi-core processor in different embodiments.

The read-only-memory 1830 may store static data and instructions that are needed by the processing unit(s) 1810 and other modules of the electronic system. The permanent storage device 1835, on the other hand, may be a read-and-write memory device. This device is a non-volatile memory unit that may store instructions and data even when the electronic system 1800 is off. Some embodiments of the invention may use a mass-storage device (such as a magnetic or optical disk and its corresponding disk drive) as the permanent storage device 1835.

Other embodiments may use a removable storage device (such as a floppy disk, flash drive, etc.) as the permanent storage device. Like the permanent storage device 1835, the system memory 1820 may be a read-and-write memory device. However, unlike storage device 1835, the system memory may be a volatile read-and-write memory, such as random access memory. The system memory may store some of the instructions and data that the processor needs at runtime. In some embodiments, the invention's processes may be stored in the system memory 1820, the permanent storage device 1835, and/or the read-only memory 1830. From these various memory units, the processing unit(s) 1810 may retrieve instructions to execute and data to process in order to execute the processes of some embodiments.

The bus 1805 may also connect to the input and output devices 1840 and 1845. The input devices may enable the user to communicate information and select commands to the electronic system. The input devices 1840 may include alphanumeric keyboards and pointing devices (also called "cursor control devices"). The output devices 1845 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 18, the bus 1805 may also couple the electronic system 1800 to a network 1825 through a network adapter (not shown). In this manner, the computer may be a part of a network of computers (such as a local area network ("LAN"), a wide area network ("WAN"), an Intranet, or a network of networks, such as the Internet. Any or all components of the electronic system 1800 may be used in conjunction with the invention.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer," "server," "processor," and "memory" all refer to electronic or other technological devices. These terms exclude people or groups of people. For the purposes of the specification, the terms display or displaying means displaying on an electronic device. As in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

In a first aspect, a method of performing transactions on an online marketplace comprises: at a server of the online marketplace, receiving a transaction request from an electronic device associated with a person; determining the person has not provided credentials to satisfy requirements for performing the transaction; sending a request from the server to the electronic device requesting a set of credentials of the person to satisfy the requirements for performing the transaction, the set of credentials comprising a government issued identity, and at least one of an institutional affiliation and information for performing background check; receiving the set of credentials of the person from the electronic device; verifying the set of credentials of the person; determining that the verified set of credentials satisfies the requirements for performing the transaction; and performing the requested transaction based on the determination.

In an embodiment of the first aspect, the requested transaction comprises one of making an offer to buy an item, making an offer to rent a premises, creating a listing, and requesting to a contact a member of the online marketplace.

In another embodiment of the first aspect, the set of credentials comprises one or more of (i) a work email, a university or college email, a work telephone number, and an employment history for verifying the institutional affiliation, (ii) a full name, a driver license number, a passport number, a plurality of digits of a social security number, a work email, a university or college email, and a work telephone number for verifying the identity, and (iii) a full name, a date of birth, an address, a social security number for verifying the background check.

An embodiment of the first aspect further comprises sending the set of credentials for verifying the identity and the set of credentials for verifying the institutional affiliation to a third party server, wherein verifying the set of credentials of the person comprises receiving, at the online marketplace server from the third party server, a verification of the identity and a verification of the institutional affiliation.

In another embodiment of the first aspect, the set of credentials comprises information for performing background check and a consent for performing the background check, the method further comprises: sending the information for performing background check to a third party server; receiving, at the online marketplace server from the third party server, a set of background check reports comprising one or more of a criminal record search report, a sex offender record check report, an Office of Foreign Assets Control (OFAC)/Patriot Act's record search report, and a known aliases search report; and determining whether the set of background check reports satisfy the requirements for performing the requested transaction.

In another embodiment of the first aspect, the set of credentials comprises an email of the person, the method further comprises: comparing a domain name associated with the email with a list of domain names associated with a plurality of whitelisted institutions; and verifying the institutional affiliation of the person when the domain name associated with the email matches a domain name associated with a whitelisted institution.

In another embodiment of the first aspect, the list of domain names comprises domain names of a plurality of companies and a plurality of academic institutions.

Another embodiment of the first aspect further comprises verifying the identity of the person when the domain name associated with the email matches the domain name associated with the whitelisted institution.

In another embodiment of the first aspect, the set of credentials comprises a telephone number of the person, the method further comprises: comparing the telephone number of the person with a list of telephone number associated with a plurality of whitelisted institutions; and verifying the institutional affiliation of the person when the telephone number of the person matches a telephone number associated with a whitelisted institution.

Another embodiment of the first aspect further comprises verifying the identity of the person when the telephone number of the person matches the telephone number associated with the whitelisted institution.

In another embodiment of the first aspect, the transaction request comprises making an offer for an item listed by a seller, wherein performing the requested transaction comprises: sending the offer to the seller; receiving an acceptance from the seller; and facilitating a peer to peer payment from a bank account of the person to a bank account to the seller.

In a second aspect, a non-transitory machine readable medium stores sets of instructions for performing transactions on an online marketplace, the sets of instructions executable by a processor of a server of the online marketplace, the sets of instructions for: at the server of the online marketplace, receiving a transaction request from an electronic device associated with a person; determining the person has not provided credentials to satisfy requirements for performing the transaction; sending a request from the server to the electronic device requesting a set of credentials of the person to satisfy the requirements for performing the transaction, the set of credentials comprising a government issued identity, and at least one of an institutional affiliation and information for performing background check; receiving the set of credentials of the person from the electronic device; verifying the set of credentials of the person; determining that the verified set of credentials satisfies the requirements for performing the transaction; and performing the requested transaction based on the determination.

In an embodiment of the second aspect, the requested transaction comprises one of making an offer to buy an item, making an offer to rent a premises, creating a listing, and requesting to a contact a member of the online marketplace.

In another embodiment of the second aspect, the set of credentials comprises one or more of (i) a work email, a university or college email, a work telephone number, and an employment history for verifying the institutional affiliation, (ii) a full name, a driver license number, a passport number, a plurality of digits of a social security number, a work email, a university or college email, and a work telephone number for verifying the identity, and (iii) a full name, a date of birth, an address, a social security number for verifying the background check.

In another embodiment of the second aspect, the non-transitory machine readable medium further stores a set of instructions for sending the set of credentials for verifying the identity and the set of credentials for verifying the institutional affiliation to a third party server, wherein the set of instructions for verifying the set of credentials of the person comprises a set of instructions for receiving, at the online marketplace server from the third party server, a verification of the identity and a verification of the institutional affiliation.

In another embodiment of the second aspect, the set of credentials comprises information for performing background check and a consent for performing the background check, the non-transitory machine readable medium further stores sets of instructions for: sending the information for performing background check to a third party server; receiving, at the online marketplace server from the third party server, a set of background check reports comprising one or more of a criminal record search report, a sex offender record check report, an Office of Foreign Assets Control (OFAC)/Patriot Act's record search report, and a known aliases search report; and determining whether the set of background check reports satisfy the requirements for performing the requested transaction.

In another embodiment of the second aspect, the set of credentials comprises an email of the person, the non-transitory machine readable medium further stores sets of instructions for: comparing a domain name associated with the email with a list of domain names associated with a plurality of whitelisted institutions; and verifying the institutional affiliation of the person when the domain name associated with the email matches a domain name associated with a whitelisted institution.

In another embodiment of the second aspect, the list of domain names comprises domain names of a plurality of companies and a plurality of academic institutions.

In another embodiment of the second aspect, the non-transitory machine readable medium further stores a set of instructions for verifying the identity of the person when the domain name associated with the email matches the domain name associated with the whitelisted institution.

In another embodiment of the second aspect, the set of credentials comprises a telephone number of the person, the non-transitory machine readable medium further stores sets of instructions for: comparing the telephone number of the person with a list of telephone number associated with a plurality of whitelisted institutions; and verifying the institutional affiliation of the person when the telephone number of the person matches a telephone number associated with a whitelisted institution.

In another embodiment of the second aspect, the non-transitory machine readable medium further stores a set of instructions for verifying the identity of the person when the telephone number of the person matches the telephone number associated with the whitelisted institution.

In another embodiment of the second aspect, the transaction request comprises making an offer for an item listed by a seller, wherein the set of instructions for performing the requested transaction comprises sets of instructions for: sending the offer to the seller; receiving an acceptance from the seller; and facilitating a peer to peer payment from a bank account.

In a third aspect, a method of performing transactions by a server of an online marketplace, comprises: by the server of the online marketplace, receiving a membership request for a person from an electronic device, the request comprising a government issued identity of the first person and an affiliation of the first person with an institution; by the server of the online marketplace, accepting the membership request after verifying the identity of the first person and verifying that the institution is one of a plurality of institutions whose affiliates may become a member of the online marketplace; receiving, from the electronic device, a request for performing a transaction that requires a meeting between the first person and a second person which is a member of the online marketplace; by the server of the online marketplace, determining that the second person requires a set of one or more background checks as a condition for scheduling a meeting in association with said transaction; receiving, from the electronic device, a consent from the first person for performing the set of background checks; by the server of the online marketplace, performing the set of background checks; determining whether a result of the set of background checks satisfies requirements for scheduling the meeting with the second person; and by the server of the online marketplace, arranging a meeting between the first and second persons to perform the transaction when the result of the set of background checks satisfies the requirements.

In an embodiment of the third aspect, the requested transaction comprises one of making an offer to rent a premises, responding to an ad for a roommate, requesting to inspect an item for sale or lease, and requesting to meet the second person.

In another embodiment of the third aspect, the government issued identity of the first person comprises one or more of a full name, a driver license number, a passport number, a plurality of digits of a social security number, a date of birth, and an address of the first person.

In an embodiment of the third aspect, the affiliation of the first person with an institution comprises one or more of a work email, a university or college email, a work telephone number, and an employment history.

In another embodiment of the third aspect, the identity of the first person comprises: from the online marketplace server, sending the identity of the first person to a third party server; and receiving, at the online marketplace server from the third party server, a verification of the identity of the first person.

In another embodiment of the third aspect, performing the set of background checks comprises: from the online marketplace serve, sending a request for performing background check to a third party server, the request comprising one or more of the first person's full name, a present address, one or more past addresses, a current employment, one or more past employments, a driver license number, a passport number, a plurality of digits of a social security number, and a date of birth; and receiving, at the online marketplace server from the third party server, a result of one or more of a criminal record search report, a sex offender record check report, an Office of Foreign Assets Control (OFAC)/Patriot Act's record search report, and a known aliases search report.

In an embodiment of the third aspect, the affiliation of the first person with an institution comprises an email of the first person, the method further comprises: by the server of the online marketplace, comparing a domain name associated with the email with domain names associated with the plurality of institutions whose affiliates may become a member of the online marketplace; and verifying the institutional affiliation of the first person when the domain name associated with the email matches a domain name associated with one of said plurality of institutions.

An embodiment of the third aspect further comprises verifying the identity of the person when the domain name associated with the email matches the domain name associated with one of the plurality of institutions whose affiliates may become a member of the online marketplace.

In another embodiment of the third aspect, the identity of the first person comprises a telephone number provided by the first person, the method further comprises: by the server of the online marketplace, verifying that the telephone number provided by the first person matches a telephone number associated with one of said plurality of institutions whose affiliates may become a member of the online marketplace; by the server of the online marketplace, placing a phone call to the telephone number provided by the first person; and by the server of the online marketplace, verifying the institutional affiliation of the person when a confirmation is received that the first person is associated with the telephone number provided by the first person.

In another embodiment of the third aspect, the identity of the first person comprises a telephone number provided by the first person, the method further comprises: from the online marketplace serve, sending the telephone number provided by the first person and a request for performing institution affiliation verification to a third party server; and receiving, at the online marketplace server from the third party server, a verification that the telephone number provided by the first person is associated with the first person and with one of said plurality of institutions whose affiliates may become a member of the online marketplace.

In a fourth aspect, a non-transitory machine readable medium stores a program which when executed by a processor of a server of an online marketplace provides security for the online marketplace, the program comprises sets of instructions for: receiving a membership request for a first person, at the server of the online marketplace, from an electronic device, the request comprising a government issued identity of the first person and an affiliation of the first person with an institution; accepting, by the server of the online marketplace, the membership request after verifying the identity of the first person and verifying that the institution is one of a plurality of institutions whose affiliates may become a member of the online marketplace; receiving, from the electronic device, a request for performing a transaction that requires a meeting between the first person and a second person which is a member of the online marketplace; determining, by the server of the online marketplace, that the second person requires a set of one or more background checks as a condition for scheduling a meeting in association with said transaction; receiving, from the electronic device, a consent from the first person for performing the set of background checks; performing, by the server of the online marketplace, the set of background checks; determining whether a result of the set of background checks satisfies requirements for scheduling the meeting with the second person; and arranging, by the server of the online marketplace, a meeting between the first and second persons to perform the transaction when the result of the set of background checks satisfies the requirements.

In an embodiment of the fourth aspect, the requested transaction comprises one of making an offer to rent a premises, responding to an ad for a roommate, requesting to inspect an item for sale or lease, and requesting to meet the second person.

In another embodiment of the fourth aspect, the government issued identity of the first person comprises one or more of a full name, a driver license number, a passport number, a plurality of digits of a social security number, a date of birth, and an address of the first person.

In another embodiment of the fourth aspect, the affiliation of the first person with an institution comprises one or more of a work email, a university or college email, a work telephone number, and an employment history.

In another embodiment of the fourth aspect, the set of instructions for verifying the identity of the first person comprises sets of instructions for: sending, from the online marketplace server, the identity of the first person to a third party server; and receiving, at the online marketplace server from the third party server, a verification of the identity of the first person.

In another embodiment of the fourth aspect, the set of instructions for performing the set of background checks comprises sets of instructions for: sending, from the online marketplace serve, a request for performing background check to a third party server, the request comprising one or more of the first person's full name, a present address, one or more past addresses, a current employment, one or more past employments, a driver license number, a passport number, a plurality of digits of a social security number, and a date of birth; and receiving, at the online marketplace server from the third party server, a result of one or more of a criminal record search report, a sex offender record check report, an Office of Foreign Assets Control (OFAC)/Patriot Act's record search report, and a known aliases search report.

In another embodiment of the fourth aspect, the affiliation of the first person with an institution comprises an email of the first person, the program further comprises sets of instructions for: comparing, by the server of the online marketplace, a domain name associated with the email with domain names associated with the plurality of institutions whose affiliates may become a member of the online marketplace; and verifying the institutional affiliation of the first person when the domain name associated with the email matches a domain name associated with one of said plurality of institutions.

An embodiment of the fourth aspect further comprises a set of instructions for verifying the identity of the person when the domain name associated with the email matches the domain name associated with the whitelisted institution.

In another embodiment of the fourth aspect, the identity of the first person comprises a telephone number provided by the first person, the program further comprises sets of instructions for: verifying, by the server of the online marketplace, that the telephone number provided by the first person matches a telephone number associated with one of said plurality of institutions whose affiliates may become a member of the online marketplace; placing, by the server of the online marketplace, a phone call to the telephone number provided by the first person; and verifying, by the server of the online marketplace, the institutional affiliation of the person when a confirmation is received that the first person is associated with the telephone number provided by the first person.

In another embodiment of the fourth aspect, the identity of the first person comprises a telephone number provided by the first person, the program further comprises sets of instructions for: sending, from the online marketplace serve, the telephone number provided by the first person and a request for performing institution affiliation verification to a third party server; and receiving, at the online marketplace server from the third party server, a verification that the telephone number provided by the first person is associated with the first person and with one of said plurality of institutions whose affiliates may become a member of the online marketplace.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method of providing security by a server of an online marketplace, the method comprising: by the server of the online marketplace, receiving a membership request for a first person from an electronic device, the request comprising a government issued identity of the first person comprising a photo, and an affiliation of the first person with an institution comprising an email address of the first person;
   sending a request to the electronic device requesting the first person to take a selfie photo by a camera of the electronic device while making one or more movements;
   taking a selfie photo by the camera while the first person made the one or more movements;
   receiving the selfie photo from the electronic device;
   verifying the identity of the first person by the server of the online marketplace based on a comparison of the selfie photo with the photo of the government issued identity of the first person;
   comparing a domain name portion of the email address of the first person with domain names of a plurality of institutions whose affiliates may become a member of the online marketplace;
   by the server of the online marketplace, determining that the institution is not one of the plurality of institutions whose affiliates may become a member of the online marketplace;
   sending a message to the electronic device indicating that the institution is not one of the plurality of institutions whose affiliates may become a member of the online marketplace;
   receiving a request from the electronic device to verify the institution, the request to verify comprising a name of the institution and a website address of the institution;
   verifying the institution as an institution whose affiliates may become a member of the online marketplace using the name and the website address of the institution;
   by the server of the online marketplace, accepting the membership request after verifying the identity of the first person and verifying the institution;
   receiving, from the electronic device, a request for performing a transaction that requires a meeting between the first person and a second person which is a member of the online marketplace;
   by the server of the online marketplace, determining that the second person requires a set of one or more background checks as a condition for scheduling a meeting in association with said transaction;
   receiving, from the electronic device, a consent from the first person for performing the set of background checks;
   by the server of the online marketplace, performing the set of background checks;

determining whether a result of the set of background checks satisfies requirements for scheduling the meeting with the second person;

and by the server of the online marketplace, arranging a meeting between the first and second persons to perform the transaction when the result of the set of background checks satisfies the requirements.

2. The method of claim 1, wherein the requested transaction comprises one of making an offer to rent a premises, responding to an ad for a roommate, requesting to inspect an item for sale or lease, and requesting to meet the second person.

3. The method of claim 1, wherein the government issued identity of the first person comprises one or more of a full name, a driver license number, a passport number, a plurality of digits of a social security number, a date of birth, and an address of the first person.

4. The method of claim 1, wherein the affiliation of the first person with an institution comprises one or more of a work email, a university or college email, a work telephone number, and an employment history.

5. The method of claim 1, wherein verifying the identity of the first person further comprises: from the online marketplace server, sending the identity of the first person to a third party server; and receiving, at the online marketplace server from the third party server, a verification of the identity of the first person.

6. The method of claim 1, wherein performing the set of background checks comprises: from the online marketplace serve, sending a request for performing background check to a third party server, the request comprising one or more of the first person's full name, a present address, one or more past addresses, a current employment, one or more past employments, a driver license number, a passport number, a plurality of digits of a social security number, and a date of birth; and receiving, at the online marketplace server from the third party server, a result of one or more of a criminal record search report, a sex offender record check report, an Office of Foreign Assets Control (OFAC)/Patriot Act's record search report, and a known aliases search report.

7. The method of claim 1 further comprising verifying the identity of the person when the institution is verified using the name and the website address of the institution.

8. The method of claim 1, wherein the identity of the first person further comprises a telephone number provided by the first person, the method further comprising: by the server of the online marketplace, verifying that the telephone number provided by the first person matches a telephone number associated with one of said plurality of institutions whose affiliates may become a member of the online marketplace; by the server of the online marketplace, placing a phone call to the telephone number provided by the first person; and by the server of the online marketplace, verifying the institutional affiliation of the person when a confirmation is received that the first person is associated with the telephone number provided by the first person.

9. The method of claim 1, wherein the identity of the first person further comprises a telephone number provided by the first person, the method further comprising: from the online marketplace serve, sending the telephone number provided by the first person and a request for performing institution affiliation verification to a third party server; and receiving, at the online marketplace server from the third party server, a verification that the telephone number provided by the first person is associated with the first person and with one of said plurality of institutions whose affiliates may become a member of the online marketplace.

10. A non-transitory machine readable medium storing a program which when executed by a processor of a server of an online marketplace provides security for the online marketplace, the program comprising sets of instructions for: receiving a membership request for a first person, at the server of the online marketplace, from an electronic device, the request comprising a government issued identity of the first person comprising a photo, and an affiliation of the first person with an institution comprising an email address of the first person; sending a request to the electronic device requesting the first person to take a selfie photo by a camera of the electronic device while making one or more movements; receiving the selfie photo taken by the camera while the first person made the one or more movements from the electronic device; verifying the identity of the first person based on a comparison of the selfie photo with the photo of the government issued identity of the first person; comparing a domain name portion of the email address of the first person with domain names of a plurality of institutions whose affiliates may become a member of the online marketplace; verifying the that the institution is one of the plurality of institutions whose affiliates may become a member of the online marketplace based on a determination that the domain name portion of the email of the first person matches a domain name of one of the plurality of institutions whose affiliates may become a member of the online marketplace; accepting, the membership request after verifying the identity of the first person and verifying that the institution is one of the plurality of institutions whose affiliates may become a member of the online marketplace; receiving, from the electronic device, a request for performing a transaction that requires a meeting between the first person and a second person which is a member of the online marketplace; determining, that the second person requires a set of one or more background checks as a condition for scheduling a meeting in association with said transaction; receiving, from the electronic device, a consent from the first person for performing the set of background checks; performing, the set of background checks;

determining whether a result of the set of background checks satisfies requirements for scheduling the meeting with the second person; and arranging, a meeting between the first and second persons to perform the transaction when the result of the set of background checks satisfies the requirements.

11. The non-transitory machine readable medium of claim 10, wherein the requested transaction comprises one of making an offer to rent a premises, responding to an ad for a roommate, requesting to inspect an item for sale or lease, and requesting to meet the second person.

12. The non-transitory machine readable medium of claim 10, wherein the government issued identity of the first person comprises one or more of a full name, a driver license number, a passport number, a plurality of digits of a social security number, a date of birth, and an address of the first person.

13. The non-transitory machine readable medium of claim 10, wherein the email address of the first person comprises one or more of a work email, and a university or college email.

14. The non-transitory machine readable medium of claim 10, wherein the set of instructions for verifying the identity of the first person comprises sets of instructions for:

sending, from the online marketplace server, the identity of the first person to a third party server; and receiving, at the online marketplace server from the third party server, a verification of the identity of the first person.

15. The non-transitory machine readable medium of claim 10, wherein the set of instructions for performing the set of background checks comprises sets of instructions for:

sending, from the online marketplace serve, a request for performing background check to a third party server, the request comprising one or more of the first person's full name, a present address, one or more past addresses, a current employment, one or more past employments, a driver license number, a passport number, a plurality of digits of a social security number, and a date of birth; and receiving, at the online marketplace server from the third party server, a result of one or more of a criminal record search report, a sex offender record check report, an Office of Foreign Assets Control (OFAC)/Patriot Act's record search report, and a known aliases search report.

16. The non-transitory machine readable medium of claim 10, the program further comprising a set of instructions for verifying the identity of the person when the domain name associated with the email matches the domain name associated with one of the plurality of institutions whose affiliates may become a member of the online marketplace.

17. The non-transitory machine readable medium of claim 10, wherein the identity of the first person further comprises a telephone number provided by the first person, the program further comprising sets of instructions for: verifying, by the server of the online marketplace, that the telephone number provided by the first person matches a telephone number associated with one of said plurality of institutions whose affiliates may become a member of the online marketplace; placing, by the server of the online marketplace, a phone call to the telephone number provided by the first person; and verifying, by the server of the online marketplace, the institutional affiliation of the person when a confirmation is received that the first person is associated with the telephone number provided by the first person.

18. The non-transitory machine readable medium of claim 10, wherein the identity of the first person further comprises a telephone number provided by the first person, the program further comprising sets of instructions for: sending, from the online marketplace serve, the telephone number provided by the first person and a request for performing institution affiliation verification to a third party server; and receiving, at the online marketplace server from the third party server, a verification that the telephone number provided by the first person is associated with the first person and with one of said plurality of institutions whose affiliates may become a member of the online marketplace.

* * * * *